(12) United States Patent
Yun et al.

(10) Patent No.: US 9,524,049 B2
(45) Date of Patent: Dec. 20, 2016

(54) FLEXIBLE DISPLAY DEVICE AND METHOD FOR CONTROLLING THE SAME

(71) Applicant: Samsung Electronics Co. Ltd., Suwon-si, Gyeonggi-do (KR)

(72) Inventors: Il-kook Yun, Suwon-si (KR); Chang-soo Lee, Seosan-si (KR); Ji-hyun Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/956,803

(22) Filed: Aug. 1, 2013

(65) Prior Publication Data
US 2014/0035869 A1    Feb. 6, 2014

(30) Foreign Application Priority Data
Aug. 1, 2012    (KR) .................... 10-2012-0084502

(51) Int. Cl.
G06F 3/041    (2006.01)
G06F 3/0488    (2013.01)
G06F 1/16    (2006.01)
G06F 3/045    (2006.01)

(52) U.S. Cl.
CPC .......... *G06F 3/0414* (2013.01); *G06F 1/1643* (2013.01); *G06F 1/1652* (2013.01); *G06F 3/045* (2013.01); *G06F 3/0488* (2013.01); *G06F 2203/04102* (2013.01); *G06F 2203/04105* (2013.01); *G06F 2203/04106* (2013.01)

(58) Field of Classification Search
None
See application file for complete search history.

(56) References Cited

U.S. PATENT DOCUMENTS

| | | | |
|---|---|---|---|
| 6,115,724 A | 9/2000 | Booker | |
| 7,990,513 B2 | 8/2011 | Belyaev | |
| 9,052,769 B2 | 6/2015 | Choi et al. | |
| 2007/0222935 A1 | 9/2007 | Belyaev | |
| 2009/0327890 A1* | 12/2009 | Mertz et al. ................... | 715/716 |
| 2010/0011291 A1 | 1/2010 | Nurmi | |
| 2010/0056223 A1 | 3/2010 | Choi et al. | |
| 2010/0060548 A1 | 3/2010 | Choi et al. | |
| 2010/0120470 A1 | 5/2010 | Kim et al. | |
| 2010/0141605 A1* | 6/2010 | Kang et al. ................... | 345/174 |
| 2010/0164888 A1 | 7/2010 | Okumura et al. | |
| 2011/0050591 A1 | 3/2011 | Kim et al. | |

(Continued)

FOREIGN PATENT DOCUMENTS

| | | |
|---|---|---|
| CN | 101674361 A | 3/2010 |
| CN | 102089737 A | 6/2011 |

(Continued)

*Primary Examiner* — Joseph Haley
(74) *Attorney, Agent, or Firm* — Jefferson IP Law, LLP

(57) ABSTRACT

A flexible display device is provided. The flexible display device includes a display configured to display first content on a screen, a sensor configured to detect bending of the flexible display device, and a controller configured to determine one area and the other area of the screen as a first screen and a second screen, respectively, based on the bending, to display the first content on the first screen, and to display second content that is different from the first content on the second screen.

21 Claims, 33 Drawing Sheets

(56) References Cited

U.S. PATENT DOCUMENTS

| | | | |
|---|---|---|---|
| 2011/0105187 A1* | 5/2011 | Dobroth | G06F 3/0481 455/566 |
| 2011/0175930 A1 | 7/2011 | Hwang et al. | |
| 2012/0133621 A1 | 5/2012 | Kim | |
| 2013/0215041 A1* | 8/2013 | Kim | G06F 3/041 345/173 |

FOREIGN PATENT DOCUMENTS

| | | |
|---|---|---|
| CN | 102576251 A | 7/2012 |
| EP | 2 166 443 A2 | 3/2010 |
| EP | 2 328 062 A2 | 6/2011 |
| RU | 2 318 230 C2 | 2/2008 |
| WO | 2011/028944 A1 | 3/2011 |
| WO | 2011/126847 A2 | 10/2011 |

* cited by examiner

FLEXIBLE DISPLAY DEVICE AND METHOD FOR CONTROLLING THE SAME

CROSS-REFERENCE TO RELATED APPLICATION(S)

This application claims the benefit under 35 U.S.C. §119(a) of a Korean patent application filed on Aug. 1, 2012 in the Korean Intellectual Property Office and assigned Serial No. 10-2012-0084502, the entire disclosure of which is hereby incorporated by reference.

TECHNICAL FIELD

The present disclosure relates to a flexible display device and a method for controlling the same. More particularly, the present disclosure relates to a flexible display device of which bending operation is possible and a method for controlling the same.

BACKGROUND

With the development of electronic technology, various types of display devices have been developed. More particularly, display devices, such as a TV, a Personal Computer (PC), a laptop computer, a tablet PC, a mobile phone, and a Motion Pictures Expert Group (MPEG-1 or MPEG-2) Audio Layer-3 (MP3) player, have high spreading factors enough to be used in most homes.

Recently, in order to meet the needs of users who desire new and diverse functions, efforts to develop new types of display devices have been made. Such new types of display devices may be called next-generation displays.

One example of such next-generation displays may be a flexible display device. The flexible display device may be a display device having the characteristic that the shape thereof can be changed like a piece of paper.

Since the shape of the flexible display device can be changed when a user applies force to bend the flexible display device, it can be used for various purposes. For example, the flexible display device may be implemented as a portable device, such as a mobile phone, a tablet PC, a digital frame, a Personal Digital Assistant (PDA), or an MP3 player.

Unlike the display devices of the related art, the flexible display device has the characteristic of flexibility, and thus, there is a need for schemes to variously use the corresponding characteristic with respect to operations of the display device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible display device and a method for controlling the same, which can provide plural pieces of content simultaneously based on bending of the display device.

In accordance with an aspect of the present disclosure, a flexible display device is provided. The flexible display device includes a display configured to display a first content on a screen, a sensor configured to detect bending of the flexible display device, and a controller configured to determine one area and another area of the screen as a first screen and a second screen, respectively, based on the bending, to display the first content on the first screen, and to display a second content that is different from the first content on the second screen.

The second content may include content displayed on the screen before the bending.

The first content may include a current content page, and the second content may include a previous content page.

The controller may be configured to display a part that corresponds to the second screen area of the screen of the previous content page on the second screen area.

The controller may be configured to change shapes and sizes of the first screen and the second screen in accordance with a user command for shifting a boundary portion between the first screen and the second screen.

The controller may be configured to terminate execution or reproduction of the first content or the second content displayed on the first screen or the second screen, if the shifted boundary portion deviates out of the screen according to the shifting of the boundary portion.

The flexible display device may further include a pressure sensor configured to detect pressure that is applied by a touch operation, wherein the controller is configured to display information on a page amount that corresponds to a level of the pressure and to display a previous content page that corresponds to the information on the page amount based on a current content page on the second screen, if the bending is detected in a state where the information on the page amount is displayed.

The touch operation may include at least one of a touch operation accompanied by the bending operation of the flexible display device or a touch operation that is applied to a touch area provided on the screen of the flexible display device.

The flexible display device may further include a pressure sensor configured to detect pressure that is applied by a touch operation, wherein the controller is configured to display a previous content page in an order that corresponds to a level of the pressure among a plurality of previous content pages previously displayed based on a current content page on the second screen.

The first content may include an application that is currently executed, and the second content may include another application that is executed as multitasking with the application.

In accordance with another aspect of the present disclosure, a method for controlling a flexible display device is provided. The method includes displaying, by a display, a first content on a screen, detecting, by a sensor, bending of the flexible display device, determining, by a controller, one area and another area of the screen as a first screen and a second screen, respectively, based on the bending, and displaying, by the display, the first content on the first screen and displaying a second content that is different from the first content on the second screen.

The second content may include a content displayed on the screen before the bending.

The first content may include a current content page, and the second content may include a previous content page.

The displaying of the second content may display a part that corresponds to the second screen area of the screen of the previous content page on the second screen area.

The method for controlling a flexible display device may further include changing shapes and sizes of the first screen and the second screen in accordance with a user command for shifting a boundary portion between the first screen and the second screen.

The method for controlling a flexible display device may further include terminating execution or reproduction of content that corresponds to the first content or the second content displayed on the first screen or the second screen, if the shifted boundary portion deviates out of the screen according to the shifting of the boundary portion.

The method for controlling a flexible display device according to the aspect of the present disclosure may further include detecting pressure that is applied by a touch operation, displaying information on a page amount that corresponds to a level of the pressure on the screen, and displaying a previous content page that corresponds to the information on the page amount based on a current content page on the second screen, if the bending is detected in a state where the information on the page amount is displayed.

The touch operation may include at least one of a touch operation accompanied by the bending operation of the flexible display device or a touch operation that is applied to a touch area provided on the screen of the flexible display device.

The method for controlling a flexible display device according to the aspect of the present disclosure may further include detecting pressure that is applied by a touch operation, and displaying a previous content page in an order that corresponds to a level of the pressure among a plurality of previous content pages previously displayed based on a current content page on the second screen.

The first content may include an application that is currently executed, and the second content may include another application that is executed as multitasking with the application.

As described above, according to various embodiments of the present disclosure, plural pieces of content are provided on one screen, and thus, user convenience is improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
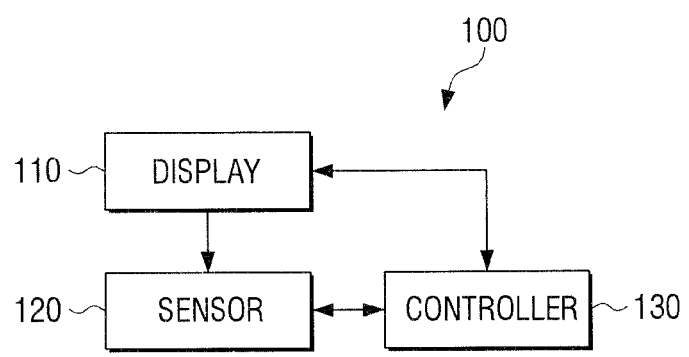
FIG. 1 is a block diagram illustrating a configuration of a flexible display device according to an embodiment of the present disclosure.

FIG. 1 is a block diagram illustrating a configuration of a flexible display device according to an embodiment of the present disclosure.

Referring to FIG. 1, a flexible display device 100 includes a display 110, a sensor 120, and a controller 130.

The display 110 provides a screen for displaying various kinds of content. The flexible display device 100 including the display 110 has the characteristic of flexibility. Accordingly, the display 110 should have a bendable structure and be made of a bendable material. The configuration of the display 110 will be described later.

The sensor 120 detects bending of the flexible display device 100 (or the display 110). The sensor 120 can recognize a bending/folding position, a bending/folding direction, a bending/folding angle, a bending/folding strength, a bending/folding speed, a bending/folding frequency, a bending/folding operation start time, a bending/folding maintaining time, and the like, using a bend sensor, a pressure sensor, a strain gauge, and the like.

More specifically, the sensor 120 may recognize the bending strength by measuring a curvature of radius R of a bending position through a change of distribution of a resistance value output from the bend sensor or the strain gauge or pressure distribution detected by the pressure sensor.

Further, the sensor 120 may recognize a bending speed based on the change of the distribution of the resistance value output from the bend sensor or the strain gauge or the bending position and strength detected through the change of the pressure distribution that is detected by the pressure sensor.

Further, the sensor 120 may detect the change of the bending state. Specifically, the sensor 120 may recognize a bending/folding position change, a bending/folding direction change, a bending/folding angle change, a bending/folding strength change, and the like.

Further, the sensor 120 may recognize a bending line formed by bending and the change state of the bending line. Specifically, the sensor may recognize the bending line through the change of the distribution of the resistance value output from the bend sensor or the strain gauge or the distribution of the pressure detected by the pressure sensor. Here, the bending line may be a point at which the degree of bending is highest in an area where the bending is performed. For example, a virtual line that is obtained by connecting bending points (or bending coordinates) where the resistance value output from the bend sensor becomes largest to each other may be the bending line.

The controller 130 may determine one area and the other area of the screen as a first screen and a second screen, respectively, based on the bending that is detected by the sensor 120, and display different kinds of content on the first screen and the second screen, respectively. In this case, the controller 130 may divide the one area and the other area based on the bending line formed by the bending.

More particularly, if the bending is detected in a state where the first content is displayed on the screen, the controller 130 may display the first content on the first screen that is determined based on the bending and display the second content that is different from the first content on the second screen. Here, the second content may be the content displayed on the screen prior to the first content before the bending.

The controller 130 may display a part that corresponds to the second screen area of the second content page on the second screen area.

Further, the controller 130 may process a boundary area between the first screen and the second screen in the form that can be identified by a user. For example, the controller 130 may make the first screen and the second screen be displayed in a divided manner by processing highlights or various colors with respect to the boundary area or displaying a boundary line or the like.

Further, the controller 130 may control a screening speed in accordance with the bending speed that is detected by the sensor 120. For example, if the bending speed exceeds a certain speed, the controller 130 may display the second content that is displayed on the second screen at high speed.

On the other hand, according to an embodiment of the present disclosure, the first content that is displayed on the first screen may be the current content page that is displayed on the current screen, and the second content that is displayed on the second screen may be the previous content page that was displayed on the screen before the bending. For example, if the current content page is the first web page through web browser execution, the previous content page may be the second web page displayed prior to the first web page. Further, if the current content page is an e-book page, the previous content page may be the e-book page previously displayed. Further, if the current content page is a page of a specific document, such as a Portable Document Format (PDF), the previous content page may be a document page displayed prior to the corresponding document page. Further, if the current content page is a specific photo content, the previous content page may be a photo content displayed prior to the corresponding photo content. However, the previous content page is not limited to the above-described examples, but may be in diverse forms according to the characteristic of the currently displayed content page. For example, if the current content page is an initial execution screen of a specific application, the previous content page may be a menu screen previously displayed to select the corresponding application.

Further, the controller 130 may display a part of the previous content page, which corresponds to the second screen area, on the second screen area. Specifically, if the second screen is an upper right corner area, the controller 130 may display information, which was displayed in the upper right corner area among the previous content page, on the second screen.

Further, the controller 130 may change the shapes and sizes of the first screen and the second screen in accordance with a user command for shifting a boundary portion between the first screen and the second screen. Here, the user command may be an operation of touching the boundary portion and dragging or flicking in a direction in which a user intends to move, or an operation of continuously shifting the bending line in a re-bending state where the bending line is formed on the boundary portion. However, the user command is not limited to the case where the bending line is continuously shifted.

If the boundary portion being shifted deviates out of the screen of the display 110, the controller 130 may terminate the execution or reproduction of the content that corresponds to the first content or the second content displayed on the first screen or the second screen. For example, if the user touches the boundary portion and drags in the direction of the second screen to shift out of the screen in a state where an application is executed on the second screen, the controller 130 may terminate the application that is executed on the second screen.

Further, if pressure that is applied by a touch operation is detected by the sensor 120, the controller 130 may display information on a page amount that corresponds to the level of the pressure. Here, the touch operation may be at least one of a touch operation accompanied by the bending operation of the flexible display device 100 or a touch operation that is applied to a touch area provided on the screen of the flexible display device 100.

Further, if the bending is detected by the sensor 120 in a state where the information on the page amount is displayed, the controller 130 may display the current content page on the first screen and display the previous content page that corresponds to the information on the page amount displayed based on the current content page on the second screen.

For example, if the bending is detected in a state where the user grips the flexible display device 100, the information on the page amount, which corresponds to the level of the pressure on the area where the touch input is performed due to the gripping, may be displayed. For example, if the strength of the pressure corresponds to a first level, information on page 5 may be displayed, while if the strength of the pressure corresponds to a second level, information on page 10 may be displayed. Further, as described above, a separate touch area may be provided, and through the touch operation on the corresponding area, the operation according to this embodiment may be performed. In this case, on the corresponding touch area, an icon for guiding the user to the corresponding touch area and guide information may be displayed. Thereafter, if the bending is detected in a state where the information on page 5 is displayed, the current content page may be displayed on the first screen of the screen that is divided based on the bending line formed by the bending, and the content page that is prior to page 5 based on the current content page may be displayed on the second screen.

Further, according to another embodiment of the present disclosure, the first content that is displayed on the first screen may be an application execution screen that is displayed on the current screen, and the second content that is displayed on the second screen may be another application execution screen that is executed as multitasking with the application that is currently executed. For example, if the bending is detected in a state where a web page screen according to the execution of the Internet application is displayed and a music player application is executed as a background, the web page screen may be displayed on the first screen and the music player screen may be displayed on the second screen.

In order to display images on a plurality of screens that are divided by the bending, the following methods may be used.

Method for Displaying Images on the Divided Screens Based on the Bending

1) Method for Displaying Images Corresponding to the Divided Screen Areas of the Whole Image.

(a) Method for Separately Displaying the First Image and the Second Image.

For example, in a case of an Organic Light Emitting Diode (OLED), a light emitting element is provided for each pixel, and it is possible to perform control by pixels. Accordingly, the first content image may be displayed on the corresponding pixel area through control of pixels corresponding to the first screen area of the first content image, and the second content image may be displayed on the corresponding pixel area through control of pixels corresponding to the second screen area of the second content image.

Further, in a case of a Liquid Crystal Display (LCD), a grid type backlight, which can be controlled in the unit of a grid, may be applied. However, various types of backlight control may be applied by areas.

(b) Method for Generating a New Image Through Combination of the First Image and the Second Image and Displaying the New Image.

For example, a method for generating a new image, that is, a new frame, through combination of the first content image corresponding to the first screen and the second content image corresponding to the second screen and displaying the corresponding image may be applied.

2) Method for Reconfiguring and Displaying Images According to the Sizes and Shapes of the Divided Screens.

Specifically, the whole image can be resealed and displayed to be optimized for the sizes of the first screen and the second screen.

For example, the images can be resealed and displayed to suit the sizes of the first screen and the second screen using a vector graphic technology. For example, in the vector type Graphical User Interface (GUI), the images are not damaged even if the sizes of the images are changed, and thus, through resealing of the images, information that is optimized for the sizes of the divided screens can be displayed.

Further, in a case of text-centered information, the images can be optimized to match the sizes of the divided screens through adjustment of a text line and the number of texts included in one text line. According to circumstances, the text size may be changed to match the sizes of the divided screens in displaying the text, and for example, the text size may be changed within the range of the minimum size and maximum size.

Figure 2:
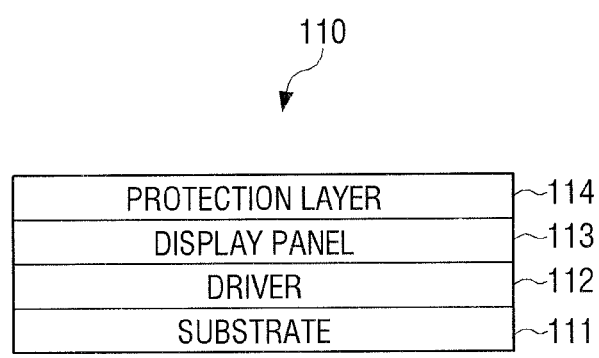
FIG. 2 illustrates a basic structure of a display constituting a flexible display device according to an embodiment of the present disclosure.

Examples of the Flexible Display Structure and the Method for Detecting the Bending FIG. 2 illustrates a basic structure of a display constituting a flexible display device according to an embodiment of the present disclosure.

Referring to FIG. 2, the display 110 may include a substrate 111, a driver 112, a display panel 113, and a protection layer 114.

The flexible display device 100 may be a device that can be curved, bent, folded, or rolled like a piece of paper while maintaining the display characteristic of the flat panel display device of the related art. Accordingly, the flexible display device should be produced on a flexible substrate.

Specifically, the substrate 111 may be implemented by a plastic substrate (e.g., a polymeric film) of which the shape can be changed by an external pressure.

The plastic substrate has a structure in which barrier coating is performed on both sides of a basic film. The basic film may be made of various kinds of resins, such as Polylmide (PI), PolyCarbonite (PC), PolyEthyleneTerephtalate (PET), PolyEtherSulfone (PES), PolyEthyleneNaphthalate (PEN), Fiber Reinforced Plastic (FRP), and the like. Further, the barrier coating is performed on opposite surfaces of the basic film, and an organic film or an inorganic film may be used to maintain the flexibility.

On the other hand, as the substrate 111, a material having the flexible characteristic, such as a thin glass or a metal foil, may be used in addition to the plastic substrate.

The driver 112 functions to drive the display panel 113. Specifically, the driver 112 applies a driving voltage to a plurality of pixels constituting the display panel 113, and may be implemented by a-si Thin Film Transistor (TFT), a Low Temperature Poly Silicon (LTPS) TFT, or an Organic TFT (OTFT). The driver 112 may be implemented in various types depending on the implementation types of the display panel 113. As an example, the display panel 113 may include an organic light emitting body having a plurality of pixel cells and an electrode layer that covers both surfaces of the organic light emitting body. In this case, the driver 112 may include a plurality of transistors that correspond to the respective pixel cells of the display panel 113. The controller 130 makes the pixel cells connected to the transistors emit light by applying an electrical signal to gates of the respective transistors. Accordingly, an image can be displayed.

Further, the display panel 113 may also be implemented by an Enhancement Layer (EL), an ElectroPhoretic Display (EPD), an ElectroChromic Display (ECD), an LCD, an Active Matrix Liquid Crystal Display (AMLCD), or a Plasma Display Panel (PDP) in addition to organic light emitting diodes. However, in the case of the LCD, it is not self-luminous, and a separate backlight is needed. In the case of the LCD that does not use the backlight, surrounding light is used. Accordingly, in order to use an LCD display panel 113 having no backlight, a specific condition, such as an outdoor environment having a large quantity of light, should be satisfied.

The protection layer 114 functions to protect the display panel 113. For example, the protection layer 114 may be made of a material, such as ZrO, CeO2, or ThO2. The protection layer 114 is produced in the form of a transparent film, and may cover the whole surface of the display panel 113.

On the other hand, unlike that illustrated in FIG. 2, the display 110 may be implemented by an electronic paper (e-paper). The e-paper is a display in which the property of a normal ink is applied to a paper, and uses a reflected light unlike a normal flat panel display. On the other hand, the e-paper can change a figure or a character using a twist ball or electrophoresis using a capsule.

On the other hand, in a case where the display 110 includes a constituent element of a transparent material, a display device which is bendable and has a transparent property can be implemented. For example, if the substrate 111 is made of a polymer material, such as plastic having a transparent property, the driver 112 is implemented by transparent transistors, and the display panel 113 is implemented by a transparent organic light emitting layer and a transparent electrode, the display device can have transparency.

The transparent transistor may be a transistor that is produced in a state where an opaque silicon of the thin film transistor of the related art is replaced by a transparent material, such as a transparent zinc oxide or titanium oxide.

Further, as the transparent electrode, an advanced material, such as an Indium Tin Oxide (ITO) or graphene, may be used. The graphene may be a material which has a honeycombed planar structure, in which carbon atoms are connected to one another, and has a transparent property. In addition, the transparent light emitting layer may be made of various materials.

Figure 3:
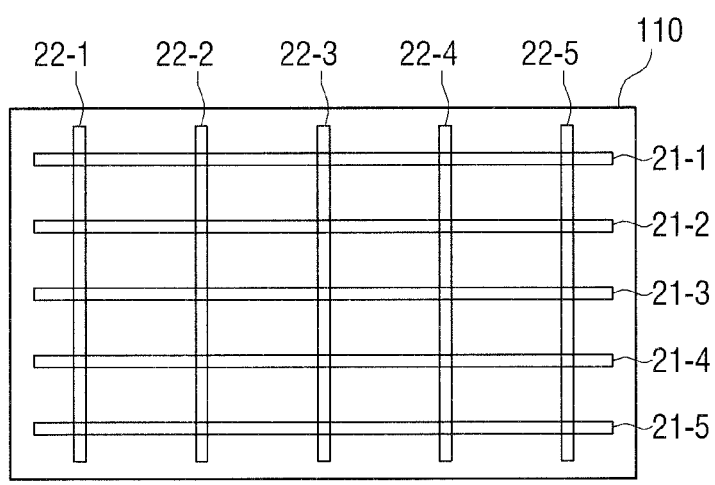
FIGS. 3, 4, and 5 illustrate a method for detecting bending according to an embodiment of the present disclosure.
Figure 4:
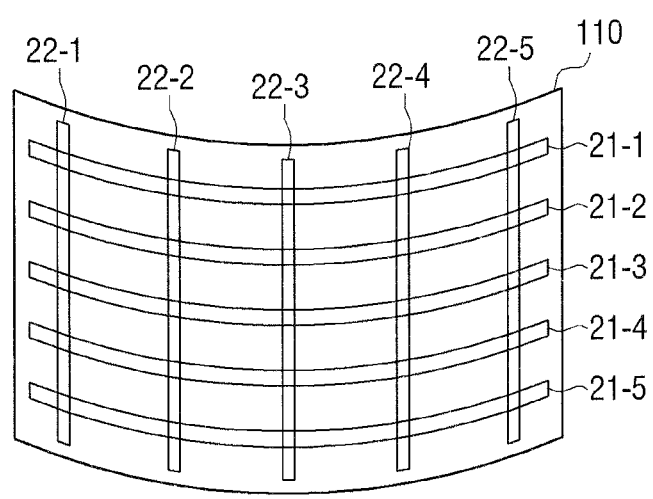
Figure 5:
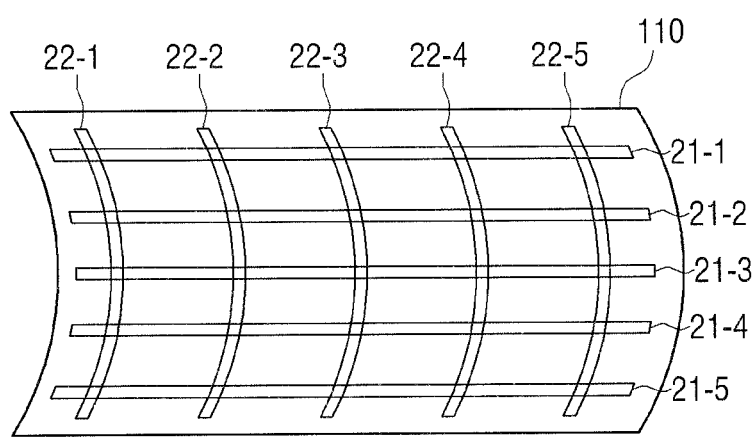

FIGS. 3, 4, and 5 illustrate a method for detecting bending in a flexible display device according to an embodiment of the present disclosure.

Referring to FIG. 3, the flexible display device 100 may be bent by an external pressure, and the shape of the flexible display device 110 may be changed. The bending may include normal bending, folding, and rolling. Here, the normal bending denotes that the flexible display device is bent.

The folding may be a state where the flexible display device is folded. Here, the folding and the normal bending may be distinct from each other depending on the degree of bending. For example, if the bending is performed over a bending angle, it is defined as the folding, while if the bending is preformed within the bending angle, it may be defined as the normal bending.

The rolling may be a state where the flexible display device is rolled up. The rolling may also be determined based on the bending angle. For example, a state where the bending over the angle is detected on an area may be defined as the rolling. By contrast, a state where the bending within the bending angle is detected on a relatively smaller area than the rolling may be defined as the folding. The above-described normal bending, folding, and rolling may be determined based on a curvature radius in addition to the bending angle.

Further, a state where the cross section of the rolled flexible display device 100 is substantially a circle or an ellipse regardless of the curvature radius may be defined as the rolling.

However, the definitions regarding the various shapes according to modified examples as described above may be differently defined depending on the kind, size, weight, and feature of the flexible display device. For example, if the bending enough to make the surfaces of the flexible display device reach each other is possible, the folding may be defined as a state where the surfaces of the device are bent to come in contact with each other. By contrast, the rolling may be defined as a state where the front surface and the rear surface of the flexible display device 100 come in contact with each other due to the bending thereof.

Hereinafter, for convenience in explanation, it is assumed that the normal bending state according to an embodiment of the present disclosure is the bending state.

The flexible display device 100 may detect the bending in various ways. For example, the sensor 120 may include a bend sensor that is arranged on one surface, that is, the front surface or the rear surface, of the display 110, or bend sensors that are arranged on both surfaces of the display 110. The controller 130 may detect the bending using a value detected by the bend sensor of the sensor 120.

Here, the bend sensor may be a sensor which is bendable and has the characteristic that its resistance value differs depending on the degree of bending. The bend sensor may be implemented in various types, such as an optical fiber bend sensor, a pressure sensor, or a strain gauge.

The bend sensor may detect the resistance value of the bend sensor using the level of current that flows through the bend sensor, and may detect the bending state at the position of the corresponding bending sensor in accordance with the resistance value.

In an implementation, FIG. 3 illustrates that the bend sensors are built in the front surface of the display 110. The bend sensors may be built in the rear surface of the display 110 or in both surfaces of the display 110. Further, the shape, the number, and the arrangement position of each bend sensor may be variously changed. For example, in the display 110, one bend sensor or a plurality of bend sensors may be coupled. Here, one bend sensor may detect one bending data, or one bend sensor may have a plurality of detecting channels that detect a plurality of bending data.

FIG. 3 illustrates an example of bend sensors in the form of a plurality of bars, which are arranged in horizontal and vertical directions in a lattice shape.

Referring to FIG. 3, the bend sensor includes bend sensors 21-1 to 21-5 arranged in the first direction and bend sensors 22-1 to 22-5 arranged in the second direction that is perpendicular to the first direction. The respective bend sensors may be arranged to be spaced apart from one another at certain intervals.

In an implementation, FIG. 3 illustrates that five bend sensors 21-1 to 21-5 and five bend sensors 22-1 to 22-5 are arranged in the horizontal and vertical directions, respectively. The number of bend sensors may be changed depending on the size of the flexible display device. As described above, the bend sensors are arranged in the horizontal and vertical directions to detect the bending performed on the whole area of the flexible display device, and in a case where a part of the flexible display device has the flexible characteristic or it is needed for a part of the flexible display device to detect the bending, the bend sensors may be arranged on the corresponding part.

The respective bend sensors 21-1 to 21-5 and 22-1 to 22-5 may be implemented in the form of electric resistor sensors using electric resistors or in the form of micro optical fiber sensors using strain of the optical fiber. Hereinafter, for convenience in explanation, it is assumed that the bend sensor is implemented as an electric resistor sensor.

Specifically, if a center area of the flexible display device 100, which is positioned in the center of the flexible display device 100 based on left and right edges of the flexible display device 100, is bent in the downward direction as shown in FIG. 4, tension due to the bending is applied to the bend sensors 21-1 to 21-5 arranged in the horizontal direction. Accordingly, the resistance values of the respective bend sensors 21-1 to 21-5 arranged in the horizontal direction are changed. The sensor 120 may detect that the bending is performed in the horizontal direction based on the center of the surface of the display by detecting the change of the output values of the bend sensors 21-1 to 21-5.

Referring to FIG. 4, it illustrates that the center area is bent in the downward direction (hereinafter referred to as the "Z− direction") that is perpendicular to the horizontal direction based on the surface of the display. However, even if the center area of the flexible display device 100 is bent in the upward direction (hereinafter referred to as the "Z+ direction") that is perpendicular to the horizontal direction based on the surface of the display, the sensor 120 may detect the bending based on the change of the output values of the bend sensors 21-1 to 21-5 arranged in the horizontal direction.

Further, if the flexible display device 100 is bent so that the center area, which is positioned in the center of the flexible display device 100 based on upper and lower edges of the flexible display device 100, is bent in the upward direction as shown in FIG. 5, the tension is applied to the bend sensors 22-1 to 22-5 arranged in the vertical direction. The sensor 120 may detect the shape change of the flexible display device 100 in the vertical direction based on the output values of the bend sensors 22-1 to 22-5.

Referring to FIG. 5, it illustrates the bending in the Z+ direction. However, even the bending in the Z− direction can be detected using the bend sensors 22-1 to 22-5 arranged in the vertical direction.

On the other hand, in a case of the shape change in a diagonal direction, the tension is applied to all the bend sensors arranged in the horizontal and vertical directions, and the sensor 120 may detect the shape change of the flexible display device 100 in the diagonal direction based on the output values of the bend sensors arrange in the horizontal and vertical directions.

Hereinafter, a method for detecting the shape change, such as the normal bending, folding, and rolling, of the flexible display device using the bend sensors will be described.

Figure 6:
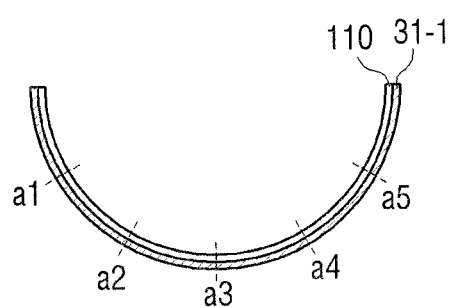
FIGS. 6 and 7 illustrate a method for detecting bending in a flexible display device using bend sensors according to an embodiment of the present disclosure.
Figure 7:
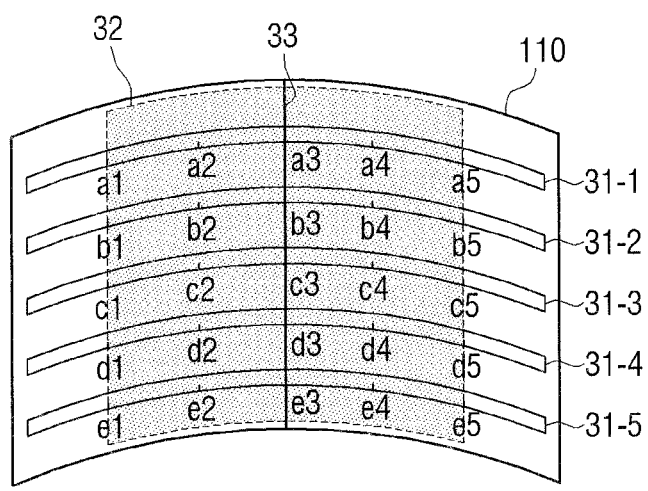

FIGS. 6 and 7 illustrate a method for detecting bending in a flexible display device using bend sensors according to an embodiment of the present disclosure.

Referring to FIG. 6, a cross-sectional view of a flexible display device 100 when the flexible display device is bent is illustrated.

If the flexible display device 100 is bent, the bend sensors arranged on one surface or both surfaces of the flexible display device 100 are also bent. In this case, the bend sensors have resistance values corresponding to the tension strength, and thus, provide output values corresponding to the resistance values.

For example, if the flexible display device 100 is bent as shown in FIG. 6, the bend sensor 31-1 that is arranged on the rear surface of the flexible display device 100 is also bent, and outputs a resistance value depending on the strength of the applied tension.

In this case, the strength of the tension becomes larger in proportion to the degree of the bending. For example, if the bending is performed as shown in FIG. 6, the degree of the bending in the center area becomes largest. Accordingly, the largest tension acts on the bend sensor 31-1 that is arranged at a point a3 that corresponds to the center area, and thus, the bend sensor 31-1 has the largest resistance value. By contrast, the degree of the bending becomes weaker toward the outside direction. Accordingly, the bend sensor 31-1 has a smaller resistance value than that at point a3 as it goes toward points a2 and a1 based on the point a3, or as it goes toward points a4 and a5.

If the bend sensor has the maximum resistance value at a specific position and has smaller resistance value as it goes toward both side directions, the sensor 120 determines that the area where the maximum resistance value is detected is the area where the largest bending is performed. Further, the sensor 120 may determine that an area where the resistance value is not changed is a flat area where the bending is not performed, and an area where the resistance value is changed over a level is a bending area where the bending is performed even slightly.

Referring to FIG. 7, a method for defining a bending area is illustrated. Since FIG. 7 illustrates a case where the flexible display device 100 is bent in the horizontal direction based on the front surface, the bend sensors arranged in the vertical direction are not illustrated for convenience in explanation. Further, although different reference numerals are used for the respective bend sensors across various figures for convenience in explanation, in practice, the bend sensors having the structure as illustrated in FIG. 3 may be used.

The bending area may be an area where the flexible display device 100 is bent. Since the bend sensors are also bent by the bending, the bending area may be defined as all points where the bend sensors which output different resistance values from the original state are arranged.

The sensor 120 may detect the size of a bending line, the direction of the bending line, the position of the bending line, the number of bending lines, the frequency of bending, the bending speed for the shape change, the size of a bending area, the position of the bending area, and the number of bending areas.

Specifically, if the distance between the points where the resistance value change is detected is within a certain distance, the sensor 120 detects the points that output resistance values as one bending area. By contrast, if the distance between the points where the resistance value change is detected is larger than the distance, the sensor 120 may define different bending areas based on the points. This will be described below with reference to FIG. 7.

FIG. 7 illustrates a method for detecting one bending area. If the flexible display device 100 is bent as shown in FIG. 7, points a1 to a5 of the band sensor 31-1, points b1 to b5 of the bend sensor 31-2, points c1 to c5 of the bend sensor 31-3, points d1 to d5 of the bend sensor 31-4, and points e1 to e5 of the bend sensor 31-5 may have different resistance values from their original states.

In this case, the points of the respective bend sensors 31-1 to 31-5, where the resistance value change is sensed, are continuously arranged at certain intervals.

Accordingly, the sensor 120 detects an area 32, which includes all the points a1 to a5 of the band sensor 31-1, the points b1 to b5 of the bend sensor 31-2, the points c1 to c5 of the bend sensor 31-3, the points d1 to d5 of the bend sensor 31-4, and the points e1 to e5 of the bend sensor 31-5, as one bending area.

On the other hand, the bending area may include a bending line. The bending line may be a line that connects different points of the bend sensors, which output the maximum values. For example, the bending line may be defined as a line that connects points where the largest resistance values are detected in the respective bending areas.

For example, in FIG. 7, a line 33, which connects the point a3 that outputs the largest resistance value in the bend sensor 31-1, the point b3 that outputs the largest resistance value in the bend sensor 31-2, the point c3 that outputs the largest resistance value in the bend sensor 31-3, the point d3 that outputs the largest resistance value in the bend sensor 31-4, and the point e3 that outputs the largest resistance value in the bend sensor 31-5, may be defined as the bending line. In FIG. 7, the bending line is formed in the vertical direction in the center area of the surface of the display.

Figure 8:
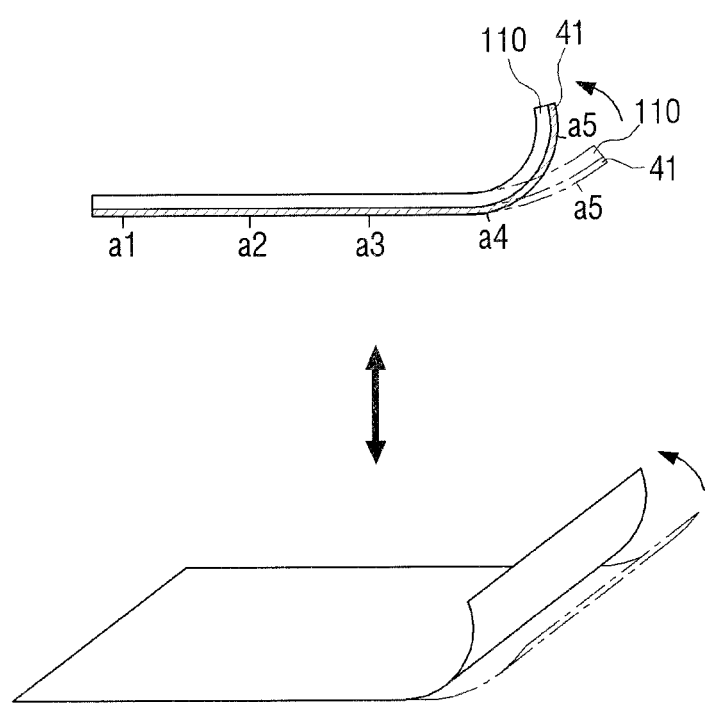
FIGS. 8 and 9 illustrate a method for determining a degree of bending according to an embodiment of the present disclosure.

FIG. 8 illustrates a method for determining a degree of bending according to an embodiment of the present disclosure.

Referring to FIG. 8, the flexible display device 100 determines the degree of bending of the flexible display device 100, that is, the bending angle, using the level change of the resistance value that is output from a bend sensor 41 at a certain interval.

The controller 130 calculates a difference between a resistance value of a point that outputs the largest resistance value in the bend sensor 41 and a resistance value of a point that is spaced apart from the point for a certain distance.

Thereafter, the controller 130 may determine the degree of bending using the calculated resistance value difference. Specifically, the flexible display device 100 may divide the degree of bending into a plurality of levels and may match resistance values having a range to the respective levels to store the plurality of levels with their resistance values.

Accordingly, the flexible display device 100 may determine the degree of bending in accordance with the level of the plurality of levels at which the calculated resistance value difference is divided according to the degree of bending.

For example, as illustrated in FIG. 8, the flexible display device 100 may determine the degree of bending based on the difference between the resistance value, which is output from the point a5 that outputs the largest resistance value in the bend sensor 41 provided on the rear surface of the flexible display device 100, and the resistance value, which is output from the point a4 that is spaced apart from the point a5 for a certain distance.

More specifically, the flexible display device 100 may confirm the level, to which the resistance value difference that is calculated in the embodiment illustrated in FIG. 8 belongs, among a plurality of levels pre-stored, and may determine the degree of bending corresponding to the confirmed level. Here, the degree of bending may be expressed as a bending angle or a bending strength.

On the other hand, if the degree of bending becomes high as illustrated in FIG. 8, the difference between the resistance value output from the point a5 of the bend sensor 41 and the resistance value output from the point a4 becomes larger than the resistance value difference of the related art. Accordingly, the controller 130 may determine that the degree of bending becomes higher.

On the other hand, as described above, the bending direction of the flexible display device 100 may differ like Z+ direction or Z− direction.

Figure 9:
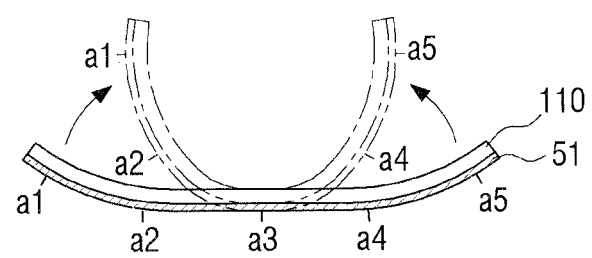
Figure 9:
Figure 9:
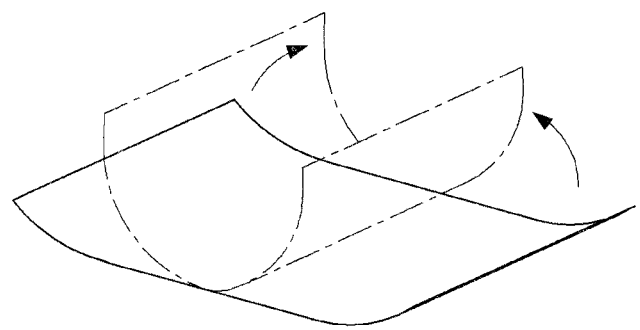

FIG. 9 illustrates a method for determining a degree of bending according to an embodiment of the present disclosure.

Referring to FIG. 9, the degree of bending may be determined through the change of a bending radius R. Since the bending radius R can be determined through the difference between the resistance values of the bend sensors (i.e., a bend sensor 51), the description thereof will be omitted.

On the other hand, the bending direction may also be detected in various ways. As an example, two bend sensors may be arranged to overlap each other, and the bending direction may be determined in accordance with the difference between level changes of the resistance values of the respective bend sensors.

Figure 10:
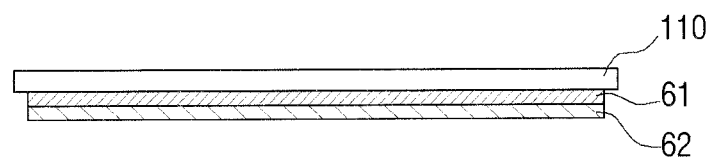
FIGS. 10, 11, and 12 illustrate a method for detecting a bending direction using bend sensors according to an embodiment of the present disclosure.
Figure 11:
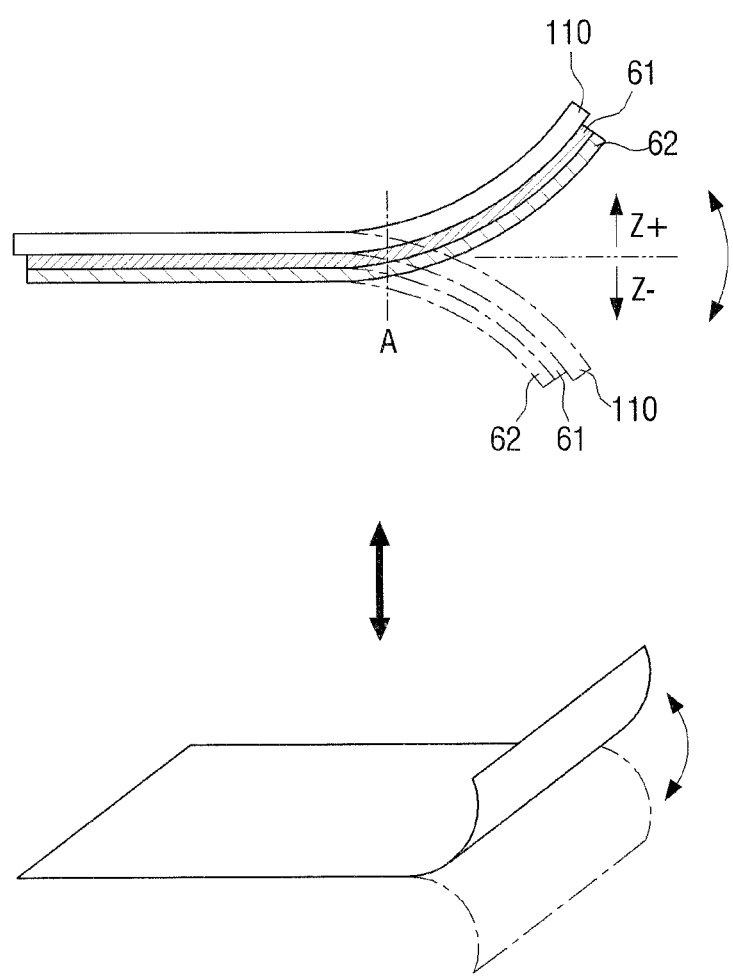
Figure 12:
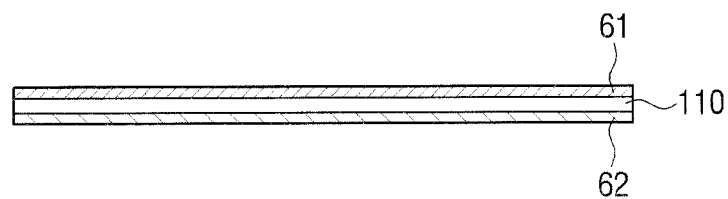

FIGS. 10, 11, and 12 illustrate a method for detecting a bending direction using bend sensors according to an embodiment of the present disclosure.

Referring to FIGS. 10 and 11, two bend sensors 61 and 62 may be provided to overlap each other on one side of the display 110. In this case, if bending is performed in one direction, the upper bend sensor 61 and the lower bend sensor 62 detect different resistance values at a point where the bending is performed. Accordingly, by comparing the resistance values of the two bend sensors 61 and 62 at the same point, the bending direction can be known.

Specifically, if the flexible display device 100 is bent in the Z+ direction as illustrated in FIG. 11, tension is applied to the lower band sensor 62 with a higher strength than that of the upper bend sensor 61 at a point A corresponding to the bending line.

By contrast, if the flexible display device 100 is bent in the rear direction, tension is applied to the upper band sensor 61 with a higher strength that that of the lower band sensor 62.

Accordingly, the controller 130 may detect the bending direction by comparing the resistance values of the two bend sensors 61 and 62 at the point A.

FIGS. 10 and 11 illustrate that the two bend sensors are arranged to overlap each other on one side of the display 110. However, the bend sensor may be arranged on both surfaces of the display 110.

Referring to FIG. 12, it illustrates a state where two bend sensors 61 and 62 are arranged on both surfaces of the display 110 according to an embodiment of the present disclosure.

Accordingly, if the flexible display device 100 is bent in the first direction (hereinafter referred to as the "Z+ direction") that is perpendicular to the screen, the bend sensor that is arranged on the first surface of the display 110 receives a compressive force, and the bend sensor that is arranged on the second surface of the display 110 receives a tension. By contrast, if the flexible display device 100 is bent in the second direction (hereinafter referred to as the "Z− direction") that is opposite to the first direction, the bend sensor that is arranged on the second surface receives the compressive force, and the bend sensor that is arranged on the first surface receives the tension. As described above, different values are detected from the two bend sensors depending on the bending direction, and the controller 130 may discriminate the bending directions according to the detection characteristic of the values.

On the other hand, FIGS. 10 to 12 illustrate that the bending direction is detected using two bend sensors. However, the bending direction may be discriminated by a strain gauge arranged on one surface of the display 110. For example, the compressive force or the tension is applied to the strain gauge arranged on one surface depending on the bending direction, and thus, the bending direction can be known through confirmation of the characteristic of the output values.

Figure 13A:
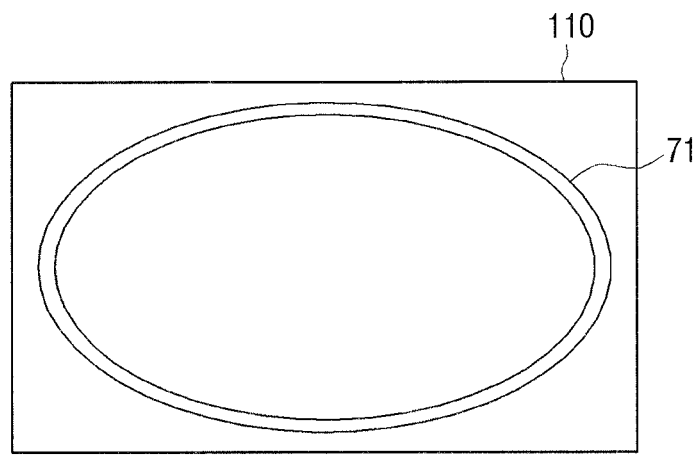
FIG. 13A illustrates a configuration in which one bend sensor is arranged on one surface of a display to detect bending according to an embodiment of the present disclosure.

FIG. 13A illustrates a configuration in which one bend sensor is arranged on one surface of a display to detect the bending according to an embodiment of the present disclosure.

Referring to FIG. 13A, a bend sensor 71 may be implemented in the form of a closed curve that forms a circle, a rectangle, or a polygon, and may be arranged at an edge of the display 110. The controller 130 may determine the point where the output value change is detected on the closed curve as a bending area. In addition, the bend sensor may be coupled to the display 110 in the form of an open curve, such as an "S" shape, a "Z" shape, or a zigzag.

Figure 13B:
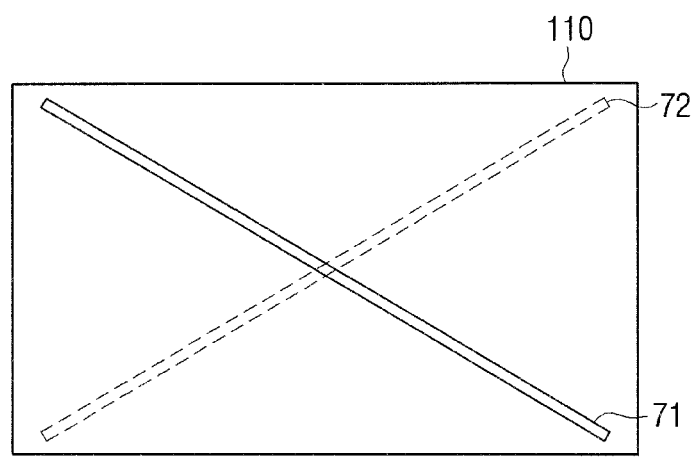
FIG. 13B illustrates a configuration in which two bend sensors are arranged to cross each other according to an embodiment of the present disclosure.

FIG. 13B illustrates a configuration in which two bend sensors are arranged to cross each other according to an embodiment of the present disclosure.

Referring to FIG. 13B, a first bend sensor 71 is arranged on the first surface of the display 110, and a second bend sensor 72 is arranged on the second surface of the display 110. The first bend sensor 71 is arranged in a first diagonal direction on the first surface of the display 110, and the second bend sensor 71 is arranged in a second diagonal direction on the second surface of the display 110. Accordingly, in accordance with various bending conditions, such as in a case where corner areas are bent, in a case where edge areas are bent, in a case where the center portion is bent, or in a case where folding or rolling is performed, the output values and the output points of the first and second sensor 71 and 72 may differ, and the controller 130 may determine what type of bending is performed according to such output value characteristics.

In the above-described various embodiments, it is exemplified that line-shaped bend sensors are used. However, the bending may be detected using a plurality of fragmentary strain gauges.

Figure 14:
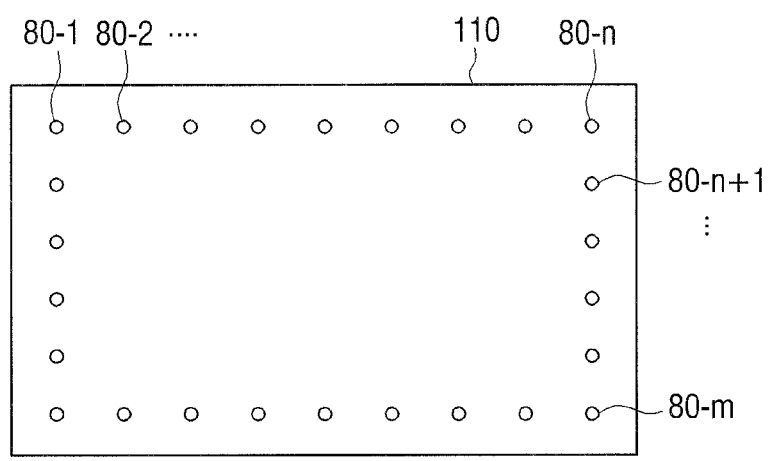
FIG. 14 illustrates a method of detecting bending in a flexible display device using a plurality of strain gauges according to an embodiment of the present disclosure.

FIG. 14 is a view illustrating an embodiment to detect bending using a plurality of strain gauges according to an embodiment of the present disclosure.

The strain gauge is to detect the change of the surface of an object that is targeted for measurement in accordance with the change of the resistance value of metal or semiconductor of which the resistance is greatly changed according to the level of force that is applied thereto. In general, a material, such as metal, has the characteristic that if the length thereof is increased by the force from the outside, the resistance value thereof is increased, while if the length is decreased, the resistance value thereof is decreased. Accordingly, by detecting the change of the resistance value, it can be determined whether the bending is performed.

Referring to FIG. 14, a plurality of strain gauges are arranged in the edge area of the display 110. The number of strain gauges may be changed depending on the size or the shape of the display 110 or a bending sensor resolution.

In a state where the strain gauges are arranged as shown in FIG. 14, a user may bend a certain point in a certain direction. Specifically, if one corner area is bent, force is applied to the strain gauges that overlap the bending line among the strain gauges 80-1 to 80-n arranged in the horizontal direction. Accordingly, the output values of the corresponding strain gauges become larger than the output values of other strain gauges. Further, force is applied to the strain gauges that overlap the bending line among the strain gauges 80-n to 80-m arranged in the vertical direction, and thus, the output values thereof are changed. The controller 130 may determine that a line that connects the two strain gauges of which the output values are changed is a bending line.

On the other hand, the strain gauges may be arranged on one surface or on both surfaces of the display 110. In a case where the strain gauges are arranged on both surfaces of the display 110, that is, in the front and rear surface directions, the strain gauges arranged in the front surface direction may detect the bending in a case where concave bending is performed in the front surface direction, that is, in the Z+ direction, and the strain gauges arranged in the rear surface may detect concave bending in the rear surface direction, that is, in the Z− direction.

Further, if the strain gauges are arranged on one surface of the display 10, that is, on the front or rear surface of the display 10, the strain gauges may detect all the bending in the front surface and the bending in the rear surface.

Unlike those described with reference to FIGS. 11 to 14, the flexible display device 100 may detect the bending direction using various sensors, such as a gyro sensor, a geomagnetic sensor, an acceleration sensor, and the like.

Figure 15:
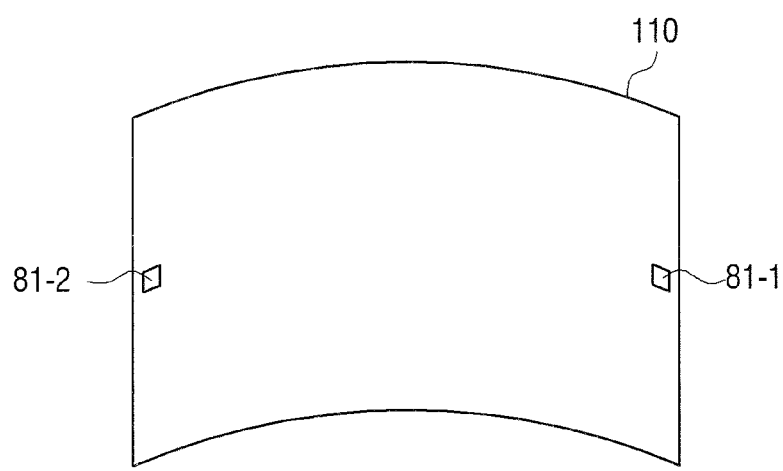
FIG. 15 illustrates a method for detecting a bending direction using an acceleration sensor according to an embodiment of the present disclosure.

FIG. 15 illustrates a method for detecting the bending direction using an acceleration according to an embodiment of the present disclosure.

Referring to FIG. 15, the flexible display device 100 includes a plurality of acceleration sensors 81-1 and 81-2.

The acceleration sensors 81-1 and 81-2 are sensors that can measure acceleration and the direction of acceleration when movement occurs. Specifically, the acceleration sensors 81-1 and 81-2 output detecting values that correspond to gravitational acceleration that is changed in accordance with inclination of the device to which the sensors are attached. Accordingly, by arranging the acceleration sensors 81-1 and 81-2 in both edge areas of the flexible display device, output values of the acceleration sensors 81-1 and 81-2 are changed when the flexible display device is bent. The controller 130 calculates a pitch angle and a role angle using the output values of the acceleration sensors 81-1 and 81-2. Accordingly, the bending direction can be determined based on the degree of change of the pitch angle and the role angle detected by the acceleration sensors 81-1 and 81-2.

FIG. 15 illustrates that the acceleration sensors 81-1 and 81-2 are arranged at both ends of the front surface of the flexible display device 100 in the horizontal direction. However, the acceleration sensors 81-1 and 81-2 may also be arranged in the vertical direction. In this case, if the flexible display device 100 is bent in the vertical direction, the bending direction can be detected in accordance with the measurement values detected by the acceleration sensors 81-1 and 81-2 in the vertical direction.

On the other hand, according to another embodiment, the acceleration sensors may be arranged on all the upper, lower, left, and right edges or may be arranged in corner areas.

As described above, the bending direction may be detected using the gyro sensor or the geomagnetic sensor in addition to the acceleration sensor. The gyro sensor is a sensor that detects the acceleration by measuring Coriolis force that acts in the speed direction if a rotating motion occurs. According to the measurement value of the gyro sensor, it is possible to detect which direction the flexible display device is rotated in, and thus, the bending direction can be sensed. The geomagnetic sensor is a sensor that detects an azimuth angle using a two-axis or three-axis fluxgate. In a case where the sensor is implemented by geomagnetic sensors, the positions of the geomagnetic sensors arranged at respective edge portions are changed if the edge portions are bent, and the geomagnetic sensors output electrical signals corresponding to the change of the geomagnetism. The controller 130 may calculate a yaw angle using values output from the geomagnetic sensors. Accordingly, various bending characteristics, such as the bending area and the bending direction, may be determined in accordance with the change of the calculated yaw angle.

As described above, the flexible display device 100 can detect the bending using various types of sensors. The above-described sensor configuration and the detecting method may be applied to the flexible display device 100 individually or in combination.

On the other hand, the sensor 120 can also detect a user's operation to touch the screen of the display 110.

Specifically, the sensor 120 may detect the touch using a capacitive overlay, a resistive overlay, an infrared beam, a surface acoustic wave, an integral strain gauge, or a piezoelectric.

Here, the capacitive overlay is a method of detecting a position by detecting capacitive change when a finger touches the screen.

A resistive overlay is a method of detecting a contact position, in which upper and lower surfaces come in contact with each other through a pressing operation to change the resistance value, the voltage change occurs due to current flowing through both ends, and the contact position is detected by the degree of the voltage change.

Further, an infrared beam is a method of detecting a position using a state where light emitted from an infrared light emitting diode is intercepted and is not detected by a phototransistor on the opposite side when an object that can intercept light, such as a finger, touches the screen in a monitor having an opto-matrix frame mounted thereon.

A surface acoustic wave is a method of detecting a time interval of sound that is reflected and received through a transmitter and a reflector according to a simple principle using the characteristic that ultrasound waves propagate along the surface and the sound propagation characteristic that the propagation distance is constant for a constant time.

An integral strain gauge is a method of calculating coordinate values, in which if a user's finger presses one of four corners on which tension measurement devices are provided, the tension measurement device provided on the pressed corner receives the largest force, the degree of the force is converted into an electrical signal to be transferred to the controller, and the controller calculates ratios of the electrical signals at the four corners to obtain the coordinate values.

A piezoelectric is a method of recognizing a touch position by calculating ratios of the electrical signals at four corners, which receive different pressures depending on the degree of pressure and the position of pressure when a user touches a point.

For example, the sensor 120 may include a transparent conductive film, such as an ITO, deposited on the substrate 111 in the display 110 and a film formed on the upper side thereof. Accordingly, if a user touches the screen, upper and lower plates at a touch point come in contact with each other to produce an electrical signal, and this electrical signal is transferred to the controller 130. The controller 130 recognizes the touch point using the coordinates of an electrode through which the electrical signal is transferred. Since the touch detecting method is known in various prior-art documents, further description thereof will be omitted.

Since the function of the controller 130 has been described, the explanation thereof will be omitted.

Figure 16:
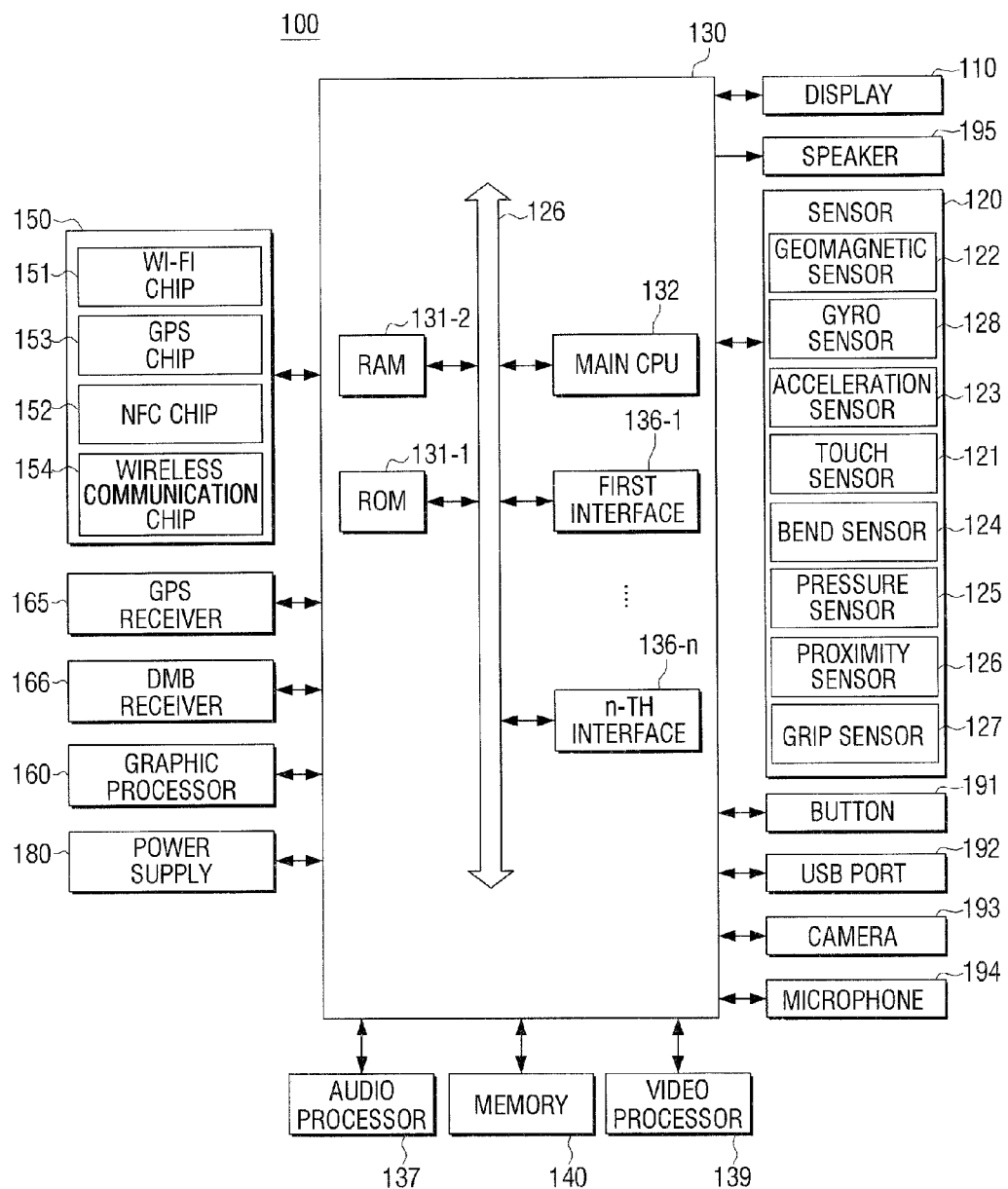
FIG. 16 is a block diagram illustrating a configuration of a flexible display device according to an embodiment of the present disclosure.

Configuration Example of a Flexible Display Device According to Various Embodiments of the Present Disclosure FIG. 16 is a block diagram illustrating a configuration of a flexible display device according to an embodiment of the present disclosure.

Referring to FIG. 16, a flexible display device 100 includes a display 110, a sensor 120, a controller 130, a memory 140, a communicator 150, a voice recognizer 160, a motion recognizer 170, a speaker 195, external input ports 190-1 to 190-*n*, and a power supply 180. In addition, the flexible display device 100 may include a GPS receiver 165, a DMB receiver 166, a graphic processor 160, an audio processor 137, a video processor 139, a button 191, a USB port 192, a camera 193, and a microphone, 194.

The display 110 has the flexible characteristic. Since the configuration and the operation of the display 110 have been described, the duplicate description thereof will be omitted.

In the memory 140, various kinds of programs and data related to the operation of the flexible display device 100, setting information set by a user, system operating software, and various kinds of application programs may be stored.

Figure 17:
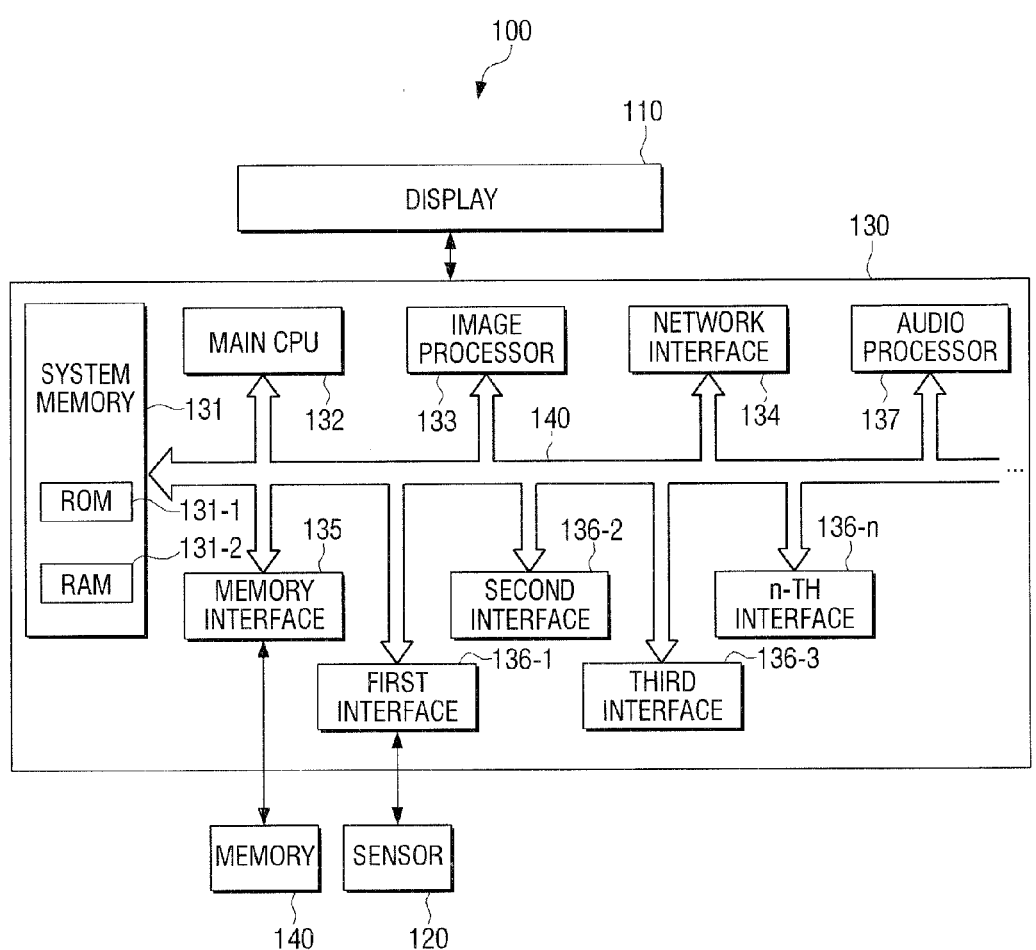
FIG. 17 is a diagram illustrating a configuration of a controller according to an embodiment of the present disclosure.

The sensor 120 detects a user operation occurring in the flexible display device 100 including the display 110, and particularly, a bending operation and a touch operation. Referring to FIG. 17, the sensor 120 may include various types of sensors, such as a touch sensor 121, a geomagnetic sensor 122, an acceleration sensor 123, a bend sensor 124, a pressure sensor 125, a proximity sensor 126, a grip sensor 127, and a gyro sensor 128.

The touch sensor 121 may be implemented as a capacitive type or a resistive type. The capacitive type touch sensor may be a sensor which calculates touch coordinates by detecting fine electricity that is induced in a body of a user using a dielectric material that is coated on the surface of the display 110 when a part of the body of the user touches the surface of the display 110. The resistive type touch sensor may be a touch sensor which includes two electrode plates built in a remote controller 200, and calculates touch coordinates by detecting a current flow when the user touches the surface of the display 110 and the upper and lower plates of the touched point come in contact with each other. In addition, infrared beam, surface acoustic wave, integral strain gauge, or piezoelectric may be used to detect the touch operation.

A resistive overlay is a method of detecting a contact position, in which upper and lower surfaces come in contact with each other through a pressing operation to change the resistance value, the voltage change occurs due to current flowing through both ends, and the contact position is detected by the degree of the voltage change.

Further, an infrared beam is a method of detecting a position using a state where light emitted from an infrared light emitting diode is intercepted and is not detected by a phototransistor on the opposite side when an object that can intercept light, such as a finger, touches the screen in a monitor having an opto-matrix frame mounted thereon.

A surface acoustic wave is a method of detecting a time interval of sound that is reflected and received through a transmitter and a reflector according to a simple principle using the characteristic that ultrasound waves propagate along the surface and the sound propagation characteristic that the propagation distance is constant for a constant time.

An integral strain gauge is a method of calculating coordinate values, in which if a user's finger presses one of four corners on which tension measurement devices are provided, the tension measurement device provided on the pressed corner receives the largest force, and the degree of the force is converted into an electrical signal to be transferred to the controller. In this case, the controller may obtain the touch position by calculating the ratios of the electrical signals at the four corners.

A piezoelectric is a method of recognizing a touch position by calculating the ratios of the electrical signals at four corners, which receive different pressures depending on the degree of pressure and the position of pressure when a user touches a point, through the controller.

As described above, the touch sensor 121 may be implemented in various forms.

The geomagnetic sensor 122 is a sensor for detecting the rotating state and the moving direction of the flexible display device 100, and the acceleration sensor 123 is a sensor for detecting the degree of inclination of the flexible display device 100. As described above, the geomagnetic sensor 122 and the acceleration sensor 123 may be used to detect the bending characteristics, such as the bending direction and the bending area of the flexible display device 100, and separately from this, may also be used to detect the rotating state or the inclination state of the flexible display device 100.

As described above, various types of bend sensors 124 may be provided to detect the bending state of the flexible display device 100. Since various examples of the configuration and operation of the bend sensors 124 have been described, the duplicate description thereof will be omitted.

The pressure sensor 125 detects the level of pressure that is applied to the flexible display device 100 when the user performs touch or bending operation, and provides the detected pressure to the controller 130. The pressure sensor 125 may include a piezo film that is built in the display 110 to output an electrical signal that corresponds to the level of the pressure.

FIG. 16 illustrates the pressure sensor 125 separately from the touch sensor 121. However, in a case where the touch sensor 121 is implemented by a resistive type touch sensor, the resistive type touch sensor may also serve as a pressure sensor 150.

The proximity sensor 126 is a sensor for detecting an object that approaches without coming in direct contact with the surface of the display. The proximity sensor 126 may be implemented by various types of sensors, such as a high frequency oscillation type which detects current induced by the magnetic field characteristic that is changed when the object approaches, a magnetic type using a magnet, a capacitive type which detects the capacitance that is changed due to the approach of the target object, photoelectric type, and ultrasound type.

The grip sensor 127 is a sensor which is arranged at a border or a handle portion of the flexible display device 100, separately from the pressure sensor 125, to detect a user's grip. The grip sensor 127 may be implemented by a pressure sensor or a touch sensor.

The controller 130 may analyze various kinds of detecting signals detected by the sensor 120, and if bending is sensed, may divide and display screens based on a virtual bending line formed through the bending.

For example, the controller 130 may process data acquired through communication with an external device or data stored in the memory 140, and output the processed data through the screen of the display 110 or the speaker 195. The controller 130 may include a main Central Processing Unit (CPU) 132, first to n-th interfaces 136-1 to 136-*n*, a Read Only Memory (ROM) 131-1 and a Random Access Memory (RAM) 131-2, and a system bus 140. In this case, the controller 130 may communicate with the external device using the communicator 150.

The communicator 150 is a configuration that performs communication with various types of external devices according to various types of communication methods. The communicator 150 includes various communication modules, such as a broadcast receiving module (i.e., a Wi-Fi chip) 151, a near field wireless communication module 152, a Global Positioning System (GPS) module 153, and a wireless communication module 154. Here, the broadcast receiving module 151 may include a ground-wave broadcast reception module (not illustrated) including an antenna for receiving the ground-wave broadcasting signal, a demodulator, and an equalizer, and a Digital Multimedia Broadcasting (DMB) module for receiving and processing a DMB broadcasting signal. The near field wireless communication module 152 is a module that performs communication with an external device that is positioned in a short distance according to a near field wireless communication method, such as Near Field Communication (NFC), Bluetooth, or Zigbee. The GPS module 153 is a module that receives a GPS signal from a GPS satellite and detects the current position of the flexible display device 100. The wireless communication module 154 is a module that is connected to an external network to perform communication according to the wireless communication protocol, such as Wi-Fi or the Institute of Electrical and Electronics Engineers (IEEE). In addition, the communication module 152 may further include a mobile communication module that is connected to a mobile communication network to perform communication according to various communication standards, such as 3rd Generation (3G), 3rd Generation Partnership Project (3GPP), and Long Term Evolution (LTE).

The controller 130 may control the communicator 150 to receive content from the external device or to transmit content to the external device according to the function that is performed on the screen.

Further, in addition to the bending operation or touch operation, the controller 130 may recognize a voice input or a motion input and perform an operation corresponding to the input. In this case, the controller 130 may activate the voice recognizer 160 or the motion recognizer 170.

The voice recognizer 160 collects a user's voice or an external sound using a voice acquisition means, such as a microphone (not illustrated), and transfers the collected voice or sound to the controller 130. In a voice control mode, the controller 130 may perform a task that corresponds to the user's voice if the user's voice coincides with a voice command.

On the other hand, the motion recognizer 170 acquires a user's image using an image capturing means (not illustrated), such as a camera, and provides the acquired image to the controller 130. In a motion control mode, the controller 130 analyzes the user's image, and if it is determined that the user takes a motion gesture that corresponds to a motion command, the controller 130 performs an operation corresponding to the motion gesture.

As an example, various tasks, such as channel zapping, device turn-on, turn-off, pause, reproduction, stop, rewind, fast forward, and sound mute, may be controlled by the voice or motion, but are not limited thereto.

In addition, the external input ports 1 to n (190-1 to 190-n) are connected to various types of external devices to receive various kinds of data, programs, and control commands. Specifically, the external input ports may include a Universal Serial Bus (USB) port, a headset port, a mouse port, and a Local Area Network (LAN) port. The power supply 180 is a constituent element that provides electric power to respective constituent elements of the flexible display device 100. The power supply 180 may be implemented to include an anode collector, an anode electrode, an electrolyte, a cathode electrode, a cathode collector, and a coating for coating the elements. The power supply 180 is implemented by a secondary battery that can be charged and discharged. The power supply 180 may be implemented in a flexible form so that it can be bent together with the flexible display device 100. In this case, the collectors, the electrodes, the electrolyte, and the coating may be made of a material having the flexible characteristic. The shape and material of the power supply 180 will be separately described later.

Although FIG. 16 illustrates various constituent elements that can be included in the flexible display device 100, it is not needed for the flexible display device 100 to include the whole constituent elements. Further, the constituent elements of the flexible display device 100 are not limited thereto. For example, parts of the constituent elements may be omitted or added depending on the kind of the flexible display device 100.

The controller 130 controls the respective constituent elements to perform various operations according to the user operation that is recognized through the above-described sensor 120, voice recognizer 160, and motion recognizer 170.

FIG. 17 is a diagram illustrating a configuration of a controller according to an embodiment of the present disclosure.

Referring to FIG. 17, the controller 130 includes a system memory 131, a main CPU 132, an image processor 133, a network interface 134, a memory interface 135, first to n-th interfaces 136-1 to 136-n, an audio processor 137, and a system bus 140.

The system memory 131, the main CPU 132, the image processor 133, the network interface 134, the memory interface 135, the first to n-th interfaces 136-1 to 136-n, and the audio processor 137 are connected to one another through the system bus 140 to transmit and receive various kinds of data or signals.

The first to n-th interfaces 136-1 to 136-n support interfacing between various constituent elements including the sensor 120 and the respective constituent elements in the controller 130. FIG. 17 illustrates that the sensor 120 is connected to the first interface 136-1. However, in a case where the sensor 120 includes various types of sensors as shown in FIG. 17, the sensors may be respectively connected through the interfaces. Further, at least one of the first to n-th interfaces 136-1 to 136-n may be implemented as an input interface which receives various kinds of signals from buttons provided on a body portion of the flexible display device 100 or external devices connected through the external input ports 1 to n.

The system memory 131 includes a ROM 131-1 and a RAM 131-2. In the ROM 131-1, a command set for system booting is stored. If a turn-on command is input and the power is supplied, the main CPU 132 copies the O/S stored in the memory 140 into the RAM 131-2 according to the command stored in the ROM 131-1, and boots the system by executing the O/S. If the booting is completed, the main CPU 132 copies various kinds of application programs stored in the memory 140 into the RAM 131-2, and performs various kinds of operations by executing the application programs copied into the RAM 131-2.

As described above, the main CPU 132 may perform various operations according to the execution of the application programs stored in the memory 140.

The memory interface 135 is connected to the memory 140 and transmits and receives various kinds of programs, content, and data.

As an example, if the screen is divided based on the bending, the main CPU 132 may access the memory 140 through the memory interface 135 to confirm the stored information, and may execute a function corresponding to the divided screen, for example, a content list providing function. If the user selects one piece of a moving image content in this state, the main CPU 132 executes the moving image reproduction program stored in the memory 140. In accordance with a command included in the moving image reproduction program, the main CPU 132 controls the image processor 133 to form a moving image reproduction screen.

The image processor 133 may include a decoder, a renderer, a scaler, and the like. Accordingly, the image processor 133 decodes the stored content, forms a frame by rendering the decoded content data, and scales the size of the formed frame to suit the screen size of the display 110. The image processor 133 provides the processed frame to the display 110 to display the frame.

In addition, the audio processor 137 may be a constituent element that processes audio data and provides the audio data to a sound output means, such as the speaker 195. The audio processor 137 may decode the audio data received through the communicator 150, perform noise filtering, and perform audio signal processing, such as amplification of the audio signal with an appropriate decibel. In the above-described example, if the reproduced content is a moving image content, the audio processor 137 may process audio data demuxed from the moving image content and provide the processed audio data to the speaker 195 so that the audio data can be output in synchronization with the moving image output from the image processor 133.

The network interface 134 is connected to the external devices through a network. For example, if a web browser program is executed, the main CPU 132 accesses a web server through the network interface 134. If web page data is received from the web server, the main CPU 132 controls the image processor 133 to form a web page screen and controls the display 110 to display the web page screen.

As described above, if the bending operation is detected in the flexible display device 100, the controller may detect a bending line formed by the detected bending, determine one area and the other area that are divided based on the bending line as a first screen and a second screen, and perform operation corresponding to the determined screens. The operation of the controller 130 as described above may be implemented by executing various kinds of programs stored in the memory 140.

Figure 18:
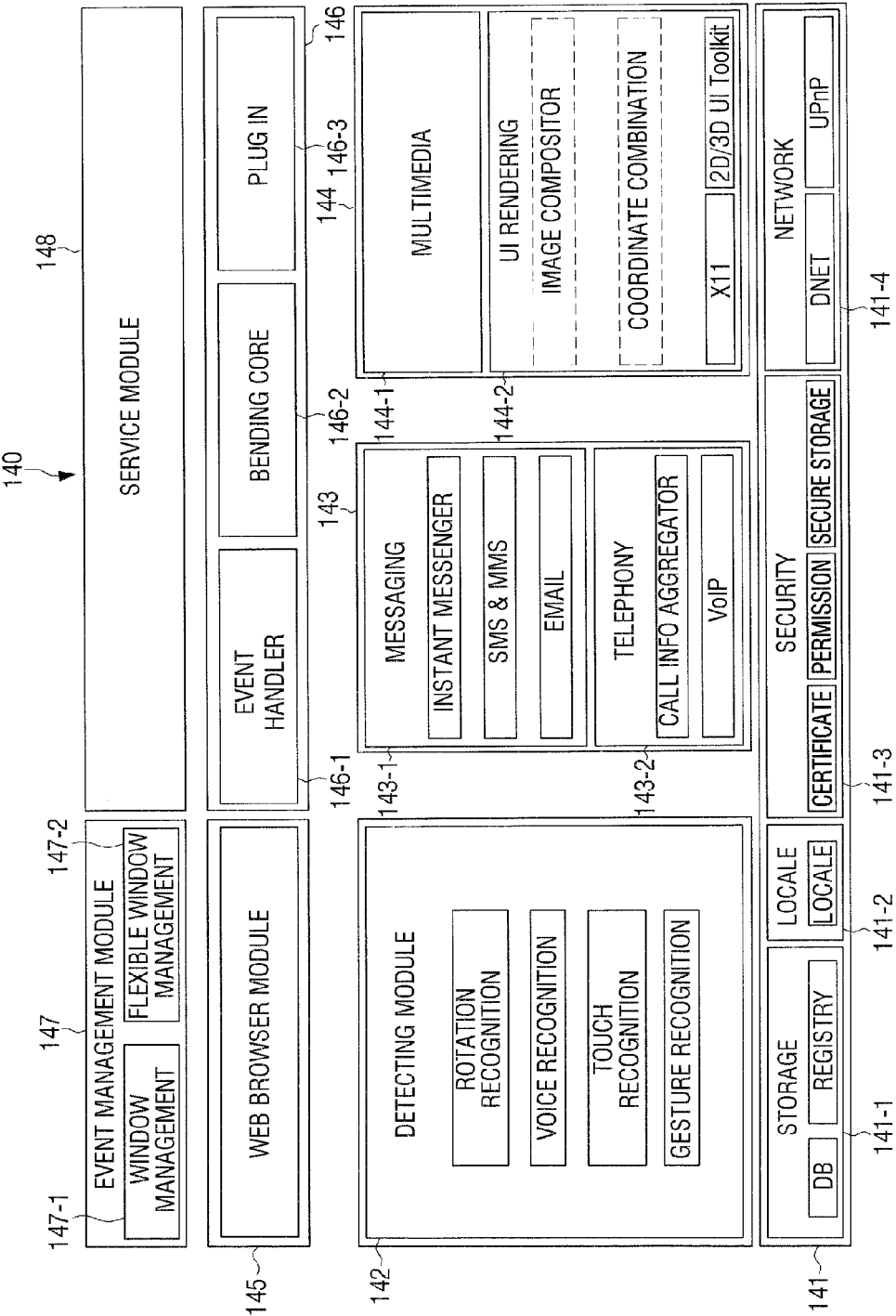
FIG. 18 illustrates a software structure of a memory for supporting an operation of a controller according to an embodiment of the present disclosure.

FIG. 18 illustrates a software structure of a memory for supporting an operation of a controller according to various embodiments of the present disclosure. FIG. 18 illustrates software layers stored in the memory 140.

Referring to FIG. 18, the memory 140 may include a base module 141, a detecting module 142, a communication module 143, a presentation module 144, a web browser module 145, a bending event handling module 146, an event management module 147, and a service module 148.

The base module 141 may be a basic module which processes signals transferred from hardware included in the flexible display device 100 and transfers the processed signals to an upper-layer module.

The base module 141 includes a storage module 141-1, a position-based module 141-2, a secure module 141-3, and a network module 141-4.

The storage module 141-1 is a program module that manages a Database (DB) or registries. The main CPU 132 may read various kinds of data by accessing the database in the memory 140 using the storage module 141-1. The position-based module 141-2 is a program module that interlocks with various kinds of hardware, such as a GPS chip, to support a position-based service. The secure module 141-3 is a program module that supports hardware certification, request permission, and secure storage, and the network module 141-4 includes a modulo DNET module and an UPnP module for supporting network connection.

The detecting module 142 is a module which collects information from various kinds of sensors included in the sensor 110, analyzes and manages the collected information. More specifically, the detecting module 142 is a program module that performs detection of operation attributes, such as coordinate values of a point where touch is performed, a touch moving direction, a moving speed, a moving distance, and the like. According to circumstances, the detecting module 142 may include a face recognition module, a voice recognition module, a motion recognition module, an NFC recognition module, and the like.

The communication module 143 is a module for performing communication with the outside. The communication module 143 may include a messaging module 143-1, such as a messenger program, a Short Message Service (SMS) & a Multimedia Message Service (MMS) program, and an e-mail program, and a phone module 143-2 including a call information aggregator program module, and a Voice over Internet Protocol (VoIP) module.

The presentation module 144 is a module for configuring a display screen. The presentation module 144 includes a multimedia module 144-1 for reproducing and outputting multimedia content, and a User Interface (UI) rendering module 144-2 performing UI and graphic processing. The multimedia module 144-1 may include a player module, a camcorder module, and a sound processing module. Accordingly, the multimedia module reproduces various kinds of multimedia content to generate and reproduce the screen and sound. The UI rendering module 144-2 may include an image compositor module combining images, a coordinate combination module combining and generating coordinates on the screen on which an image is to be displayed, an X11 module receiving various kinds of events from hardware, and a 2 Dimension (2D)/3 Dimension (3D) UI tool kit providing a tool for configuring 2D or 3D type UI.

The web browser module 145 may be a module that accesses a web server by performing web browsing. The web browser module 145 may include various modules, such as a web view module configuring a web page, a download agent module performing a download, a bookmark module, and a web kit module.

The bending event handling module 146 is a module for controlling the operation according to bending if the bending is detected. The bending event handling module 146 includes an event handler module 146-1, a bending core module 146-2, and a plug-in module 146-3. The event handler module 146-1 receives various kinds of content transferred from a flexible window management module 147-2 in the event management module 147, and classifies the event according to an event priority. Here, the term "event" denotes an event in which the bending is detected. The bending core module 146-2 performs queuing of the event classified by the event handler module 146-1 and matches the event to the corresponding program (application, widget, and the like). Further, the bending core module 146-2 transmits a rendering event signal for rendering the screen that matches the event to the presentation module 144 through the plug-in module 146-3. The plug-in module 146-3 is connected to the presentation module 144 or a flexible UI framework module (not illustrated) to perform loading.

The event management module 147 is a module for managing touch, bending gesture, and other various kinds of content. The event management module 147 includes a window management module 147-1 and the flexible window management module 147-2. The window management module 147-1 may detect a touch event detected by the touch sensor or an input event input by other input means. The window management module 147-1 transfers the detected event to the presentation module 144 or the UI framework module (not illustrated) to perform the operation corresponding to the event. The flexible window management module 147-2 transmits the bending event to the bending event handling module 146 if the bending gesture is detected by the sensor 110.

In addition, the service module 148 is an application module for providing various services. The service module 148 may include program modules for providing various services, such as a navigation program module, a game program, an electronic book module, a calendar module, an alarm management module, and the like.

The various kinds of program modules illustrated in FIG. 18 may be partially omitted, modified, or added depending on the kind and the characteristic of the flexible display device 100.

In the above-described embodiments, it is illustrated that the flexible display device 100 is in the form of a flat plate. However, the flexible display device 100 may be implemented in various shapes. For example, the flexible display device 100 may be implemented in a manner that the flexible display device 100 is built in a main body that is made of a non-flexible material.

Figure 19:
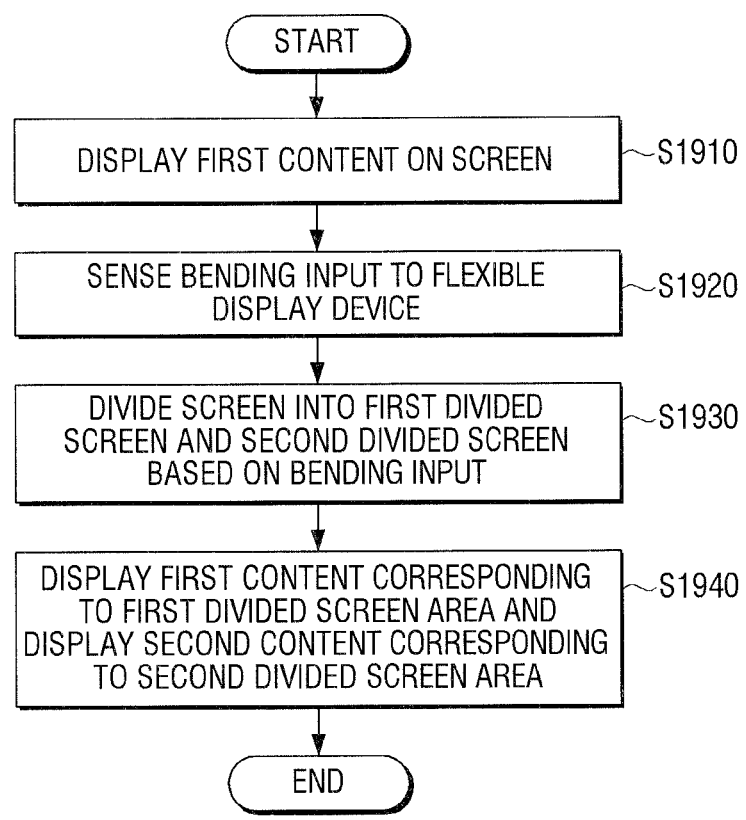
FIG. 19 is a diagram illustrating a display method of a flexible display device according to an embodiment of the present disclosure.

FIG. 19 is a diagram illustrating a display method of a flexible display device according to an embodiment of the present disclosure.

Referring to FIG. 19, a first content is displayed on a screen at operation S1910.

If bending of the flexible display device is detected at operation S1920, one area and the other area of the screen are determined as a first screen and a second screen, respectively, based on the detected bending at operation S1930.

Thereafter, the first content is displayed on the first screen, and second content that is different from the first content is displayed on the second screen at operation S1940. Here, the second content may be content displayed on the screen before the bending, and may be content displayed on the screen before the first content.

For example, the first content may be a current content page, and the second content may be a previous content page.

In the displaying of the second content at operation S1940, a part that corresponds to the second screen area of the screen of the previous content page may be displayed on the second screen area.

In displaying the first screen and the second screen, shapes and sizes of the first screen and the second screen may be changed in accordance with a user command for shifting a boundary portion between the first screen and the second screen.

If the shifted boundary portion deviates out of the screen according to the shifting of the boundary portion, the execution or reproduction of content that corresponds to the first content or the second content displayed on the first screen or the second screen may be terminated according to the moving direction of the boundary portion.

If pressure that is applied by a touch operation is detected, information on a page amount that corresponds to a level of the pressure can be displayed on the screen. Here, the touch operation may be at least one of a touch operation accompanied by the bending operation of the flexible display device or a touch operation that is applied to a touch area provided on the screen of the flexible display device.

If the bending is detected in a state where the information on the page amount is displayed, a previous content page that corresponds to the information on the page amount based on a current content page may be displayed on the second screen.

Further, if the pressure that is applied by the touch operation is detected, a previous content page in the order that corresponds to a level of the pressure among a plurality of previous content pages previously displayed based on a current content page may be displayed on the second screen.

The first content that is displayed on the first screen may be an application that is currently executed, and the second content that is displayed on the second screen may be another application that is executed as multitasking with the application.

Figure 20A:
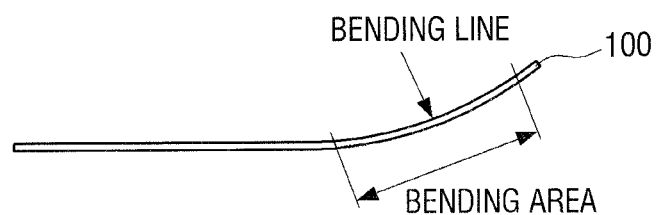
FIGS. 20A and 20B illustrate a method for dividing a screen according to an embodiment of the present disclosure.
Figure 20B:
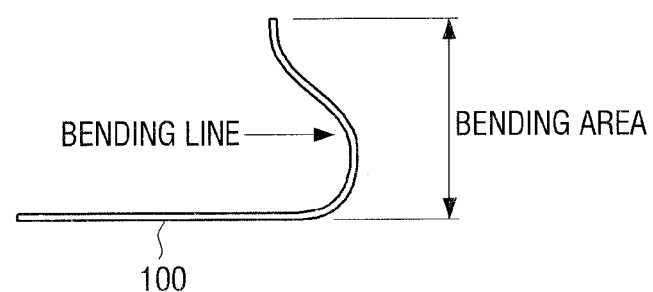

Method for Dividing a Screen According to an Embodiment of the Present Disclosure FIGS. 20A and 20B illustrate a method for dividing a screen according to an embodiment of the present disclosure.

Referring to FIGS. 20A and 20B, an area where the bending is greatly performed around the vending line formed during the bending may be recognized as the second screen. In this case, it is possible to grasp the bending degrees at respective positions through the detecting information of the bend sensors arranged in the whole area, the edge area, and the center area. Here, the bending line may be a virtual line that is obtained by connecting the points where the bending is most strongly performed to each other.

In a case of the bending as illustrated in FIG. 20A, the right area where the bending is greatly performed around the bending line may be recognized as the second screen.

Further, in a case of the bending as illustrated in FIG. 20B, the upper area where the bending is greatly performed around the bending line may be recognized as the second screen.

On the other hand, in addition to the above-described bend sensors, pressure sensors or touch sensors may be used to divide the screen, and acceleration sensors or gyro sensors may be arranged in a specific area (e.g., a corner area) of the flexible display device 100 to divide the screen.

Display Method According to Various Embodiments of the Present Disclosure

Figure 21A:
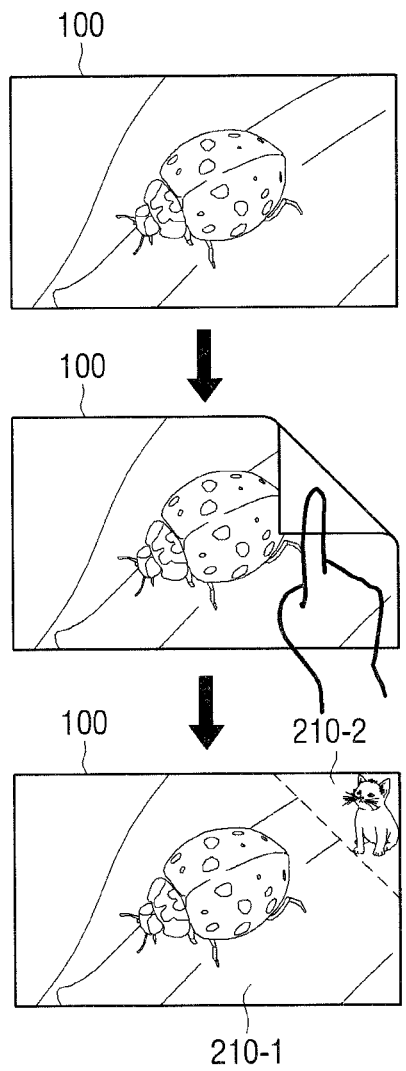
FIGS. 21A and 21B illustrate a display method according to an embodiment of the present disclosure.
Figure 21B:
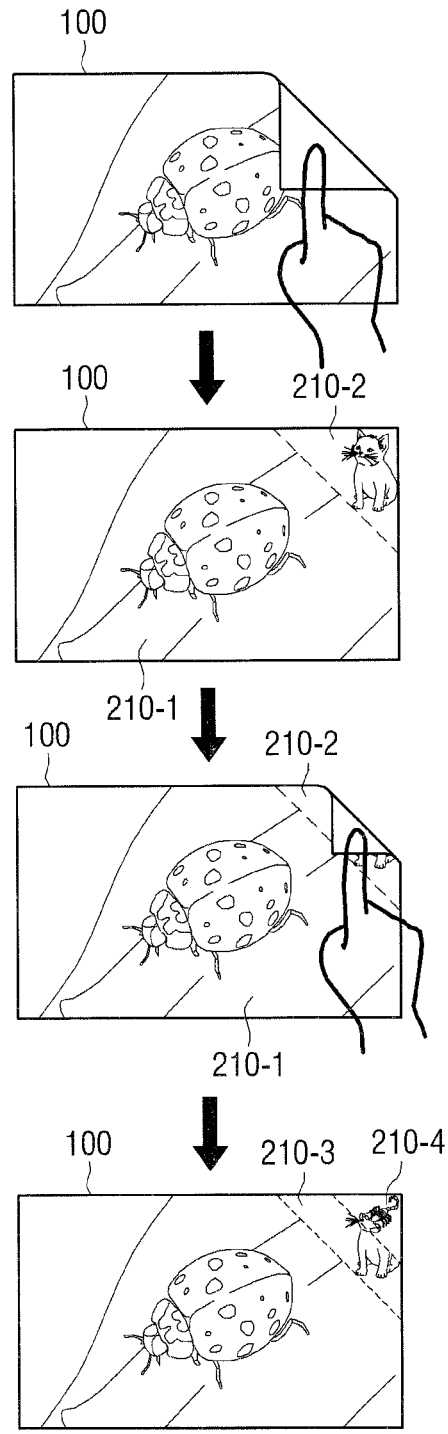

FIGS. 21A and 21B illustrate a display method according to an embodiment of the present disclosure.

Referring to FIG. 21A, if one area of the screen is bent (or folded) and the bending is released in a state where the first content is displayed on the screen of the flexible display 100, the one area and the other area that are divided based on the bending line that is formed by the bending may be determined as the first screen and the second screen.

In this case, the currently displayed content may be displayed on a first screen 210-1 of the determined screens, and the second content that is different from the first content that is currently displayed may be displayed on a second screen 210-2 that corresponds to the bending area where the position shift occurs due to the bending.

Referring to FIG. 21B, if a second bending is performed on the second screen 210-2 in a state where the first bending is performed as illustrated in FIG. 21A, the second screen 210-2 may be divided into a plurality of screens based on the bending line formed by the second bending.

In this case, the second content that is displayed on the second screen 210-2 may be displayed on a third screen 210-3 among the plurality of screens constituting the second screen 210-2, and the third content that is different from the second content may be displayed on a fourth screen 210-4 that corresponds to the bending area where the position shift occurs due to the second bending.

Figure 22A:
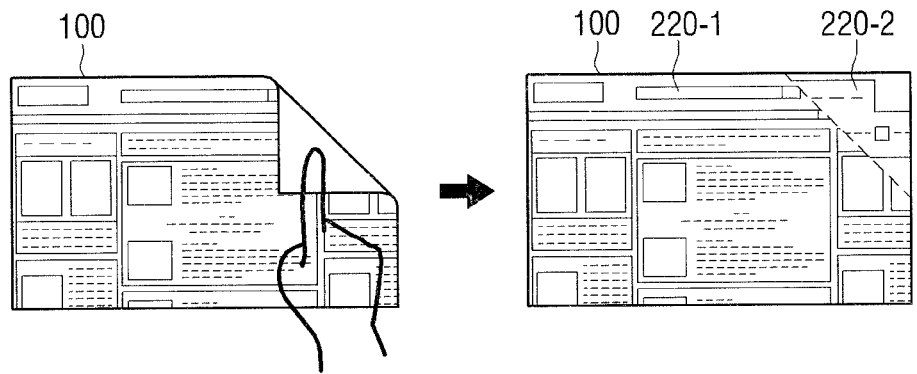
FIGS. 22A, 22B, and 22C illustrate a display method according to an embodiment of the present disclosure.
Figure 22B:
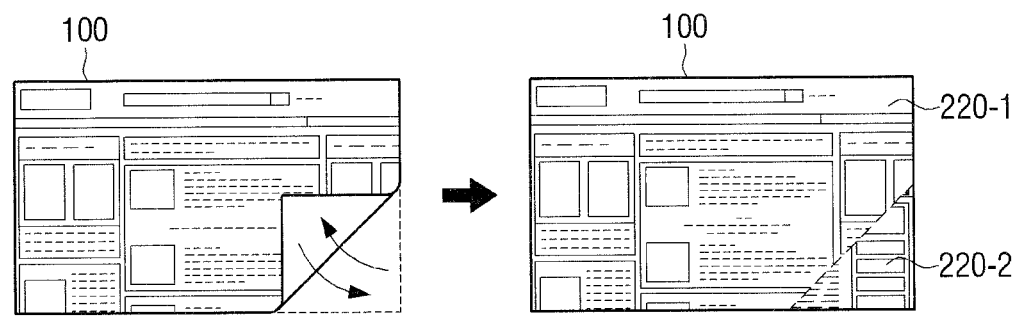
Figure 22C:
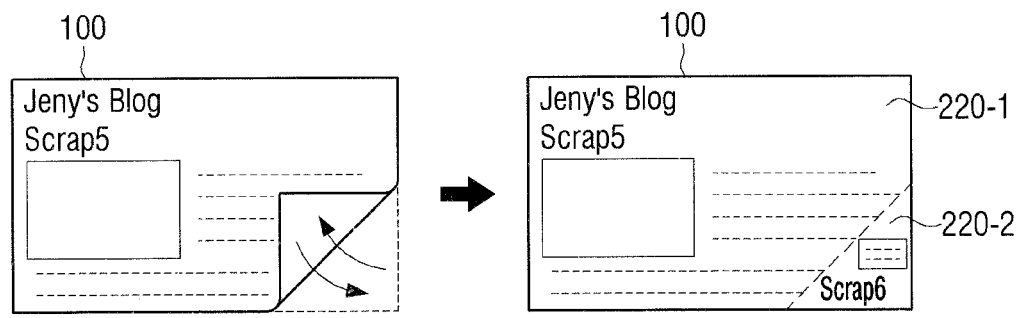

FIGS. 22A, 22B, and 22C illustrate a display method according to an embodiment of the present disclosure.

Referring to FIG. 22A, in a case of intending to confirm the previous job content in a state where the current job content is displayed, the two pieces of job content may be displayed on one screen through the bending.

For example, if one area of the screen is bent and an operation to release the bending is performed in a state where a web page is displayed on the screen of the flexible display device 100, the screen can be divided based on the bending line formed by the bending.

In this case, the current web page may be displayed on a first screen 220-1 among the plurality of divided screens, and the previous web page that was displayed on the screen prior to the corresponding web page may be displayed on a second screen 220-2 that corresponds to the bending area where the position shift occurs due to the bending. Accordingly, in the case of intending to confirm the previous job contents during performing the current job, the user can easily confirm the previous job contents by bending a partial area of the screen.

Referring to FIG. 22B, the current job content and a home screen content of the corresponding job content can be displayed on one screen through bending in a state where the current job content is displayed.

For example, if one area of the screen is bent and an operation to release the bending is performed in a state where a web page is displayed on the screen of the flexible display device 100, the current web page may be displayed on the first screen 220-1, and the home page of the corresponding web page may be displayed on the second screen 220-2 that corresponds to the bending area in which the position shift occurs due to the bending.

Referring to FIG. 22C, the two pieces of content simultaneously displayed on one screen through the bending may be content systematically arranged in before-after relations. For example, if a specific blog content is displayed on the screen as illustrated, the corresponding blog content and the blog content arranged after the corresponding blog content on the list may be simultaneously displayed on the plurality of screens 220-1 and 220-2 that are divided by the bending.

FIGS. 23A, 23B, 23C, 24, 25, 26, 27A, 27B, 27C, 28A, 28B, and 29 illustrate a display method according to an embodiment of the present disclosure.

Figure 23A:
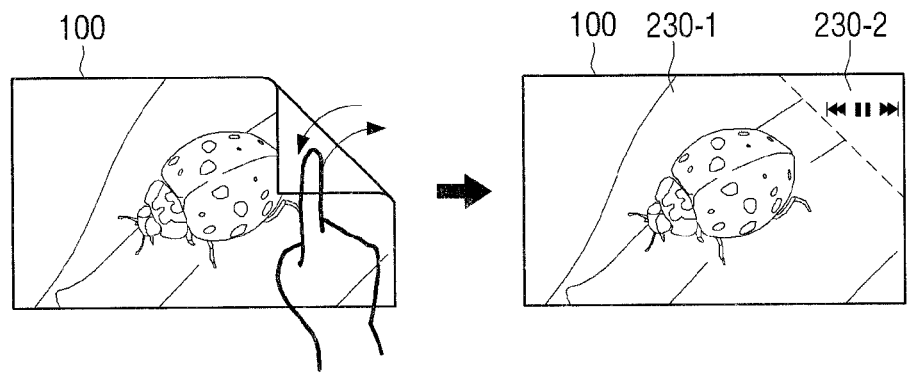
FIGS. 23A, 23B, 23C, 24, 25, 26, 27A, 27B, 27C, 28A, 28B, and 29 illustrate a display method according to an embodiment of the present disclosure.

Referring to FIG. 23A, if the screen is divided into one area and the other area through the bending in a state where an application execution screen is displayed on the screen, execution screens of the application that is currently being executed and another application that is executed as multitasking with the application may be displayed on the divided screens, respectively. For example, if bending of the flexible display device 100 is detected in a state where a web page screen according to the execution of the Internet application is displayed and a music player application is executed as a background, a web page screen may be displayed on a first screen 230-1 that is divided based on the bending, and a music player screen may be displayed on a second screen 230-2.

Figure 23B:
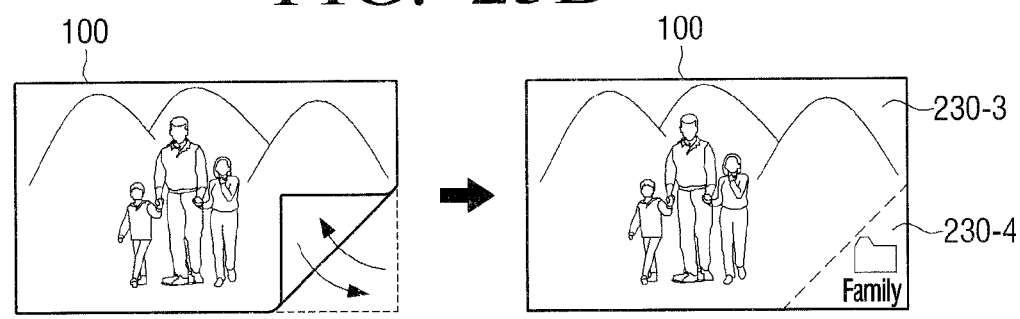

Referring to FIG. 23B, if the screen is divided through bending of the flexible display device 100 in a state where specific content is displayed on the screen, the currently displayed content and category information to which the corresponding content belongs may be displayed on the divided screens, respectively. For example, if the bending is detected in a state where photo content is displayed, the photo content may be displayed on a first screen 230-3, and folder information in which the corresponding photo content is included may be displayed on a second screen 230-4.

Figure 23C:
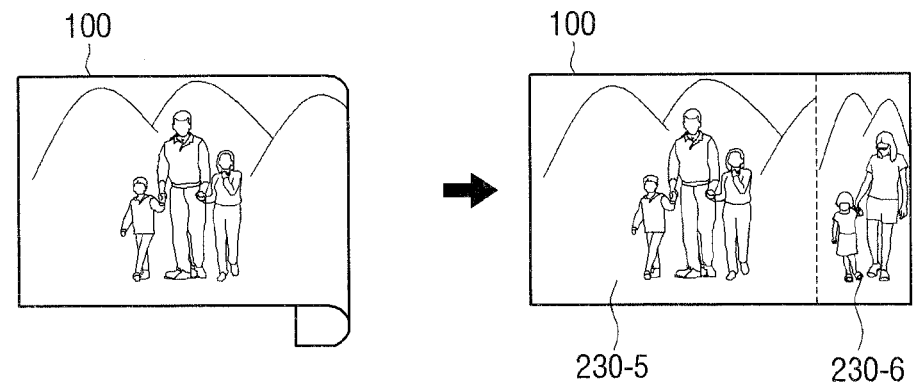

Referring to FIG. 23C, if the screen is divided through the bending of the flexible display device 100 in a state where specific content is displayed on the screen, the currently displayed content and content that is before or after the corresponding content may be displayed on the divided screens, respectively. For example, if the bending is detected in a state where photo content is displayed, the photo content may be displayed on a first screen 230-5 that is divided based on the bending, and the previous photo content that belongs to the same folder as the corresponding photo content may be displayed on a second screen 230-6.

Figure 24:
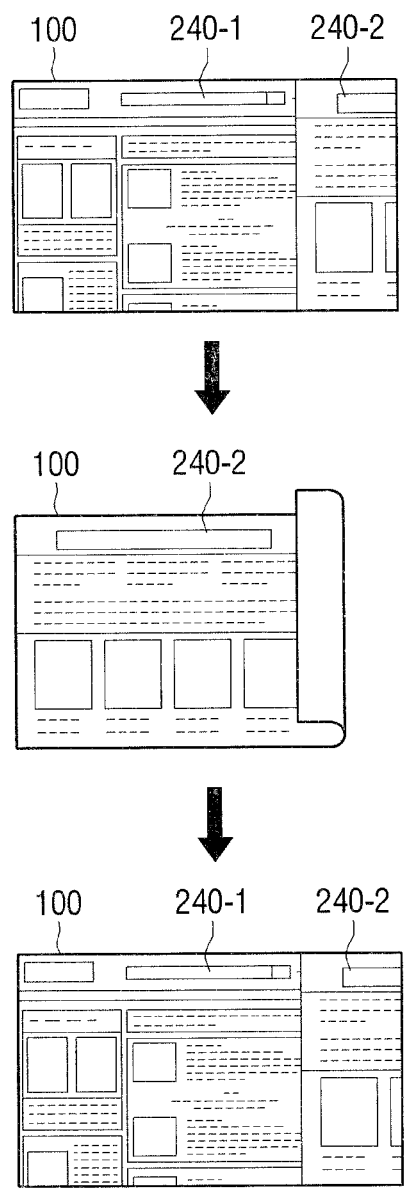

Referring to FIG. 24, if an area where a second screen 240-2 is displayed is bent again in a state where the first content and the second content are respectively displayed on a first screen 240-1 and the second screen 240-2 based on the bending of the flexible display device 100, the second content displayed on the second screen 240-2 may be displayed on the first screen 240-1. Further, if the corresponding bending is released, the content display state may return to the original state. For example, the first content may be displayed on the first screen 240-1, and the second content may be displayed on the second screen 240-2.

Figure 25:
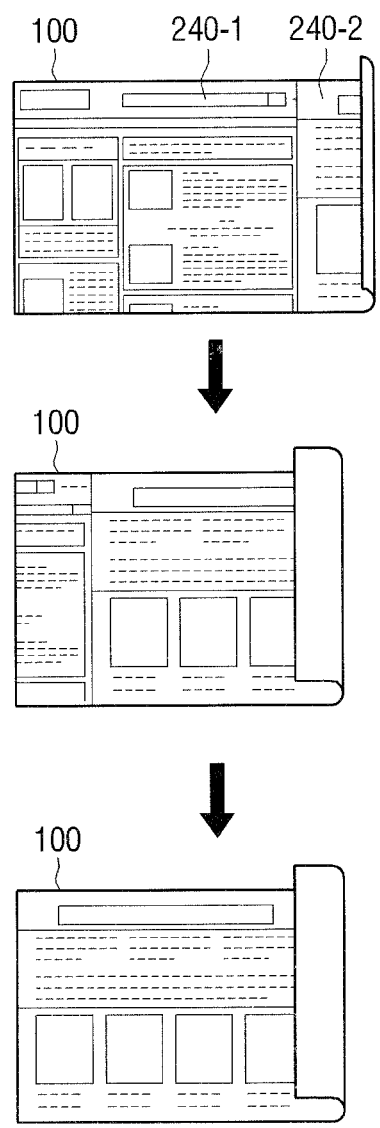

Referring to FIG. 25, if the second content is displayed on the first screen 240-1 according to the re-bending as described above with reference to FIG. 24, a graphic effect, in which the second content is displayed as successively sliding in an opposite direction from the bending area where the bending is detected, can be provided.

Figure 26:
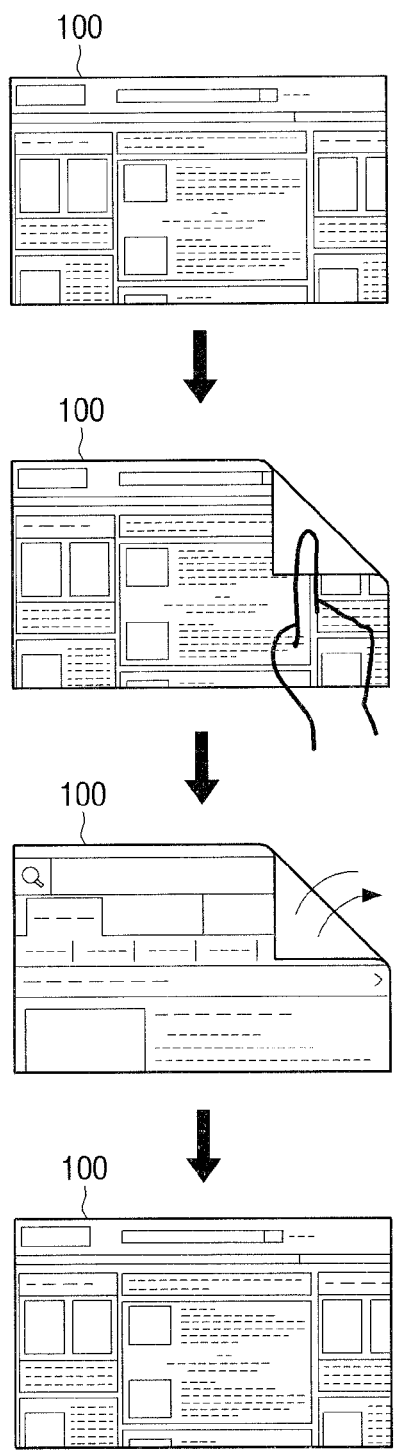

Referring to FIG. 26, by bending a partial area of the flexible display device 100, a bookmark function may be performed.

For example, after bending one corner area of the screen in a state where specific content is displayed on the screen as illustrated, the corresponding content screen may be bookmarked through fixing of the bending state. Thereafter, by releasing the bending of the fixed bending area in a state where another content screen according to another work is displayed on the screen, the content screen state may return to the bookmarked content screen.

Figure 27A:
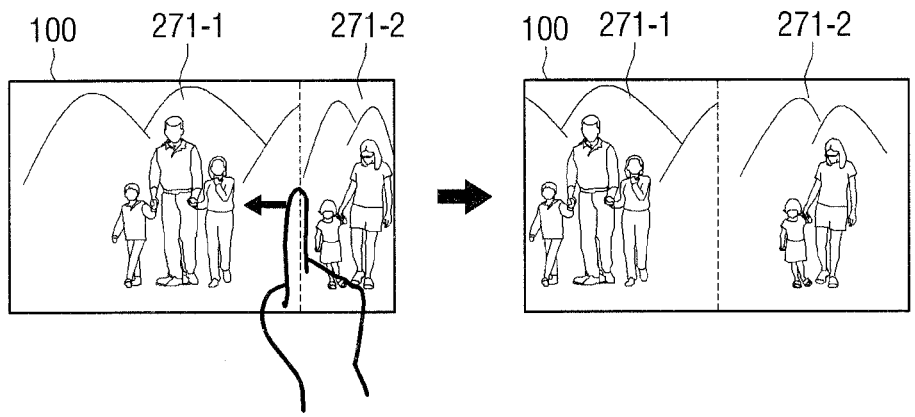

Referring to FIG. 27A, if a user operation to shift the bending line toward the direction of a first screen 271-1 is input through touch and dragging of the bending line in a state where the first content is displayed on the first screen 271-1 that is divided based on the bending and the second content is displayed on a second screen 271-2, the size of the second screen 271-2 is increased along the shifting of the bending line. In this case, the sizes of the content displayed on the first and second screens 271-1 and 271-2 may be resealed to correspond to the changed screen sizes.

Figure 27B:
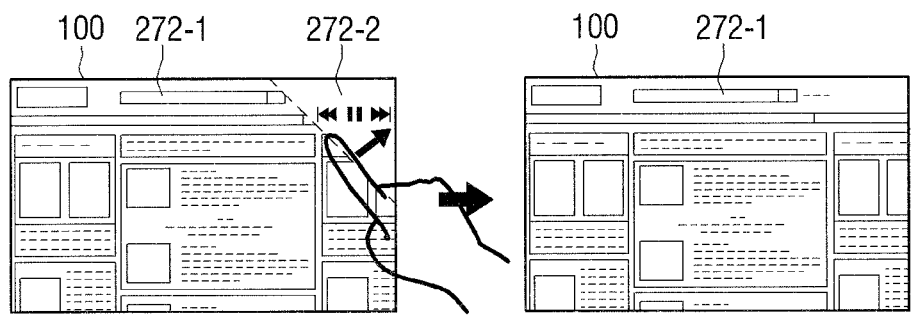

Referring to FIG. 27B, if a user operation to shift the bending line toward the direction of the second screen 272-2 to be out of the screen is input through touch and dragging of the bending line in a state where a web page content is displayed on the first screen 272-1 that is divided based on the bending and a music player screen is displayed on the second screen 272-2, a music player function that is executed on the second screen 272-2 may be terminated.

Figure 27C:
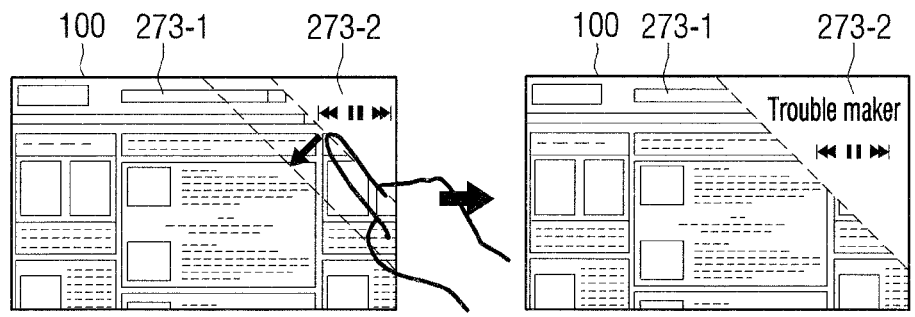

Referring to FIG. 27C, if the size of a second screen 273-2 is increased along the shifting of the bending line (thereby decreasing the size of a first screen 273-1), the amount of information displayed on the second screen 273-2 may be also increased. For example, if the size of the second screen 273-2 is increased along the shifting of the bending line in a state where a function control screen of the music player is informally displayed on the second screen 273-2 as illustrated, additional information, such as played music information, may be displayed.

Figure 28A:
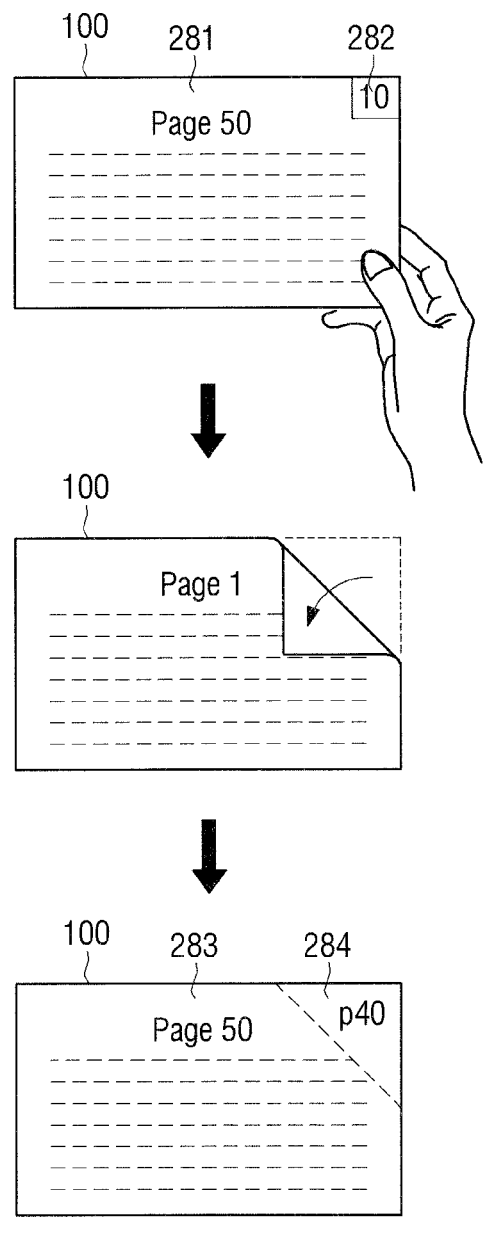
Figure 28B:
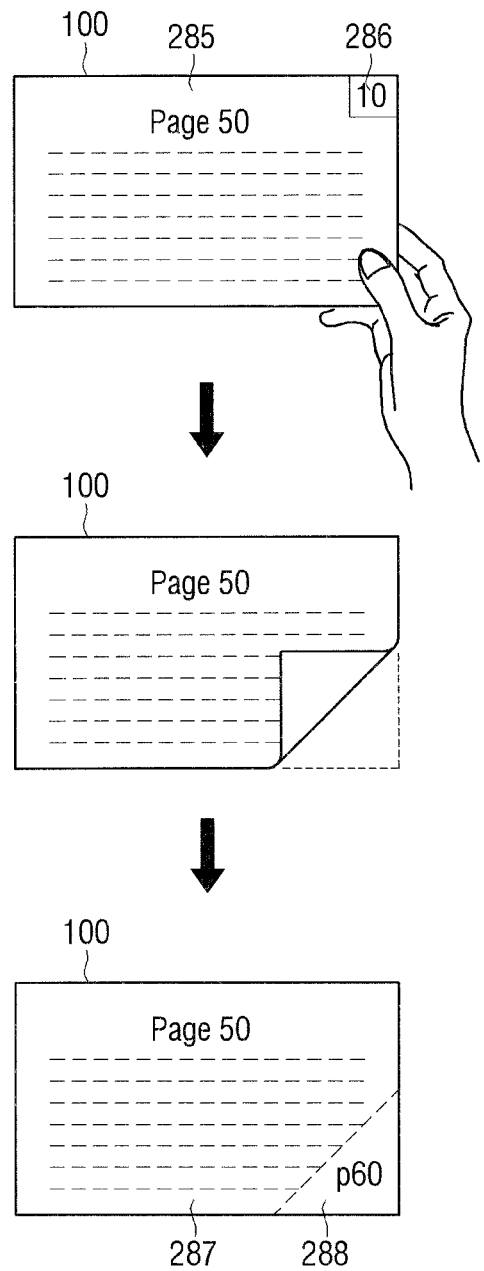

Referring to FIGS. 28A and 28B, if pressure that is applied through the touch operation is detected, information on the page amount corresponding to the level of the pressure is displayed. If bending is detected in a state where the information on the page amount is displayed, the current content page may be displayed on the first screen, and the previous content page corresponding to the information on the page amount that is displayed based on the current content page may be displayed on the second screen.

For example, if pressure that is applied through the touch operation is detected in a state where a content page corresponding to page 50 is displayed on a screen 281 as illustrated, information on page 10 that is information on the page amount corresponding to the level of the pressure may be displayed on one area 282 of the screen. Thereafter, if bending is detected on the upper right corner area, the current content page of page 50 may be displayed on a first screen 283, and a content page corresponding to page 40, which is the content page before page 10 that is displayed based on the current content page, may be displayed on a second screen 284.

Further, as illustrated in FIG. 28B, if bending is detected on the upper left corner area in a state where information on page 10 that is information on the page amount corresponding to the level of the pressure is displayed on one area 286 of the screen 285, the current content page of page 50 may be displayed on a first screen 287, and a content page corresponding to page 46, which is the content page after page 10 that is displayed based on the current content page, may be displayed on a second screen 288.

For example, in accordance with the position of the area where the bending is detected, not only the previous content page but also the following content page may be displayed.

Figure 29:
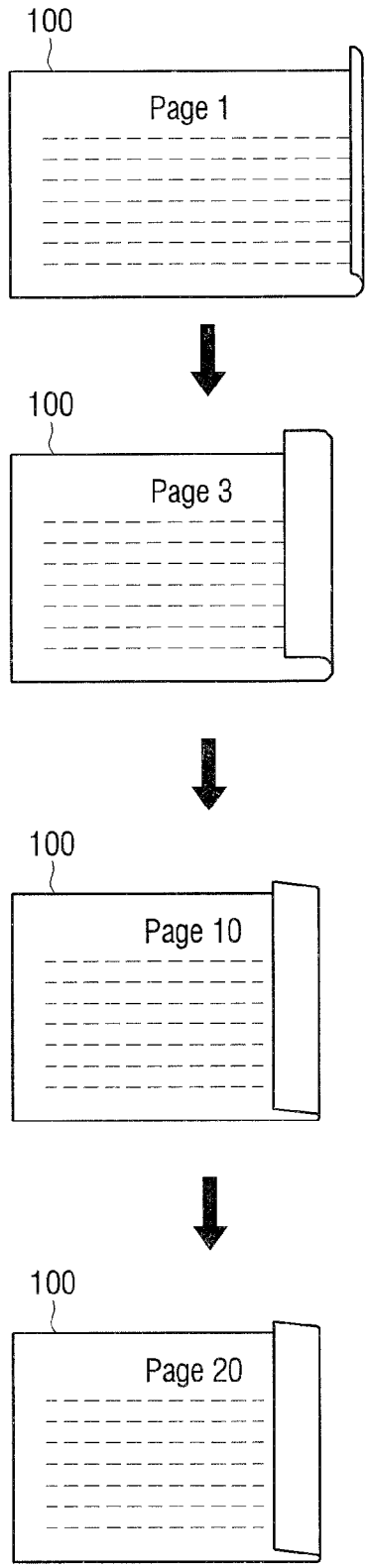

Referring to FIG. 29, depending on the degree of bending, the corresponding page amount may differ. For example, if bending corresponding to the amount of page 2 is detected in a state where the content page corresponding to page 1 is displayed, the content page of page 3 after page 2 may be displayed, and if bending corresponding to the amount of page 7 is detected, the content page of page 10 after page 7 may be displayed.

In the above-described embodiment, it is exemplified that the following content page is displayed. However, it is also possible to display the previous content page, and this embodiment can be applied in the same manner even in the case where content pages corresponding to the divided screens are displayed after the bending is released.

Figure 30A:
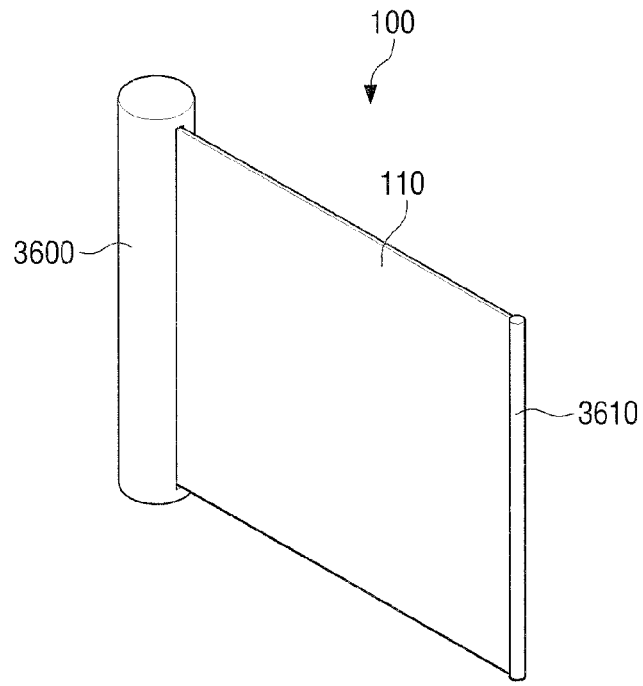
FIGS. 30A and 30B illustrate a flexible display device that is built in a main body according to an embodiment of the present disclosure.
Figure 30B:
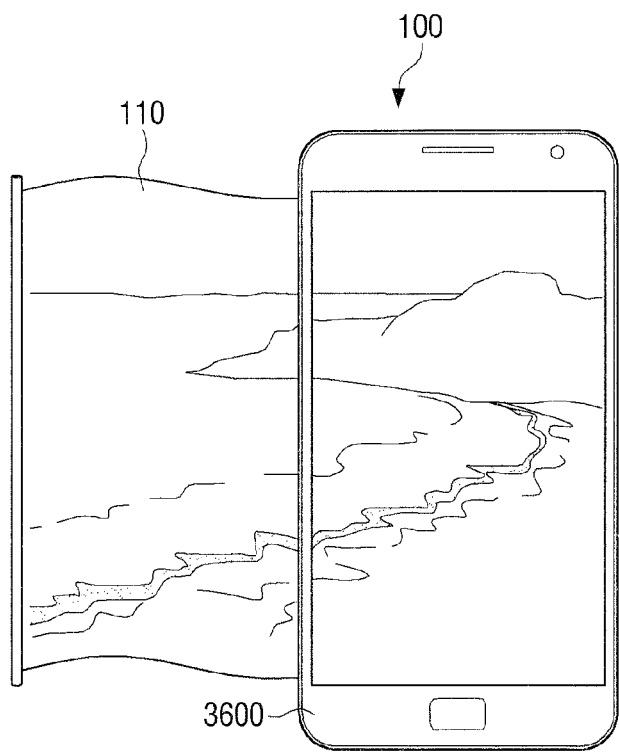

FIGS. 30A and 30B illustrate a flexible display device that is built in a main body according to an embodiment of the present disclosure.

Referring to FIG. 30A, the flexible display device 100 may include a main body 3600, a display 110, and a gripper 3610.

The main body 3600 serves as a kind of case that contains the display 110. If the flexible display device 100 includes various constituent elements as shown in FIG. 16, the remaining constituent elements, except for the display 110 and some sensors, may be mounted on the main body 3600. The main body 3600 includes a rotation roller that makes the display 110 be rolled. Accordingly, when the flexible display device 100 is not in use, the display 110 may be rolled around the rotation roller to be built in the main body 3600.

If the user grips and pulls the gripper 3610, the rotation roller is rotated in the opposite direction to rolling to release the rolling, and the display 110 comes out of the main body 3600. The rotation roller may have a stopper provided therein. Accordingly, if the user pulls the gripper 3610 over a certain distance, the rotation roller is stopped by the stopper, and the display 110 is fixed. In this state, the user can execute various kinds of functions using the display 110 that is exposed outside. On the other hand, if the user presses a button for releasing the stopper, the rotation roller is rotated in the opposite direction as the stopper is released, and as a result, the display 110 may be rolled again into the main body 3600. The stopper may be in the form of a switch that stops the operation of a gear for rotating the rotation roller. Since the structure that is used in a typical rolling structure can be used as the rotation roller and the stopper, the illustration and explanation thereof will be omitted.

On the other hand, the power supply 180 is included in the main body 3600. The power supply 180 may be implemented in various types, such as a battery connector on which a one-time use battery is mounted, a secondary battery which can be charged and used multiple times, and solar cells that perform power generation using solar heat. In a case where the power supply is implemented by the secondary battery, the user may charge the power supply 180 through connection of the main body 3600 and an external power supply using a wire.

Although the cylindrical main body 3600 is illustrated in FIG. 30A, the shape of the main body 3600 may be a rectangle or a polygon. Further, the display 150 may be implemented in various forms including surrounding the outside of the main body in addition to the form, in which the display 150 that is built in the main body 3600 is exposed to the outside by pulling.

Further, referring to FIG. 30B, the display 110 may have a structure in which the display 110 is inserted into the main body 3600.

Figure 31:
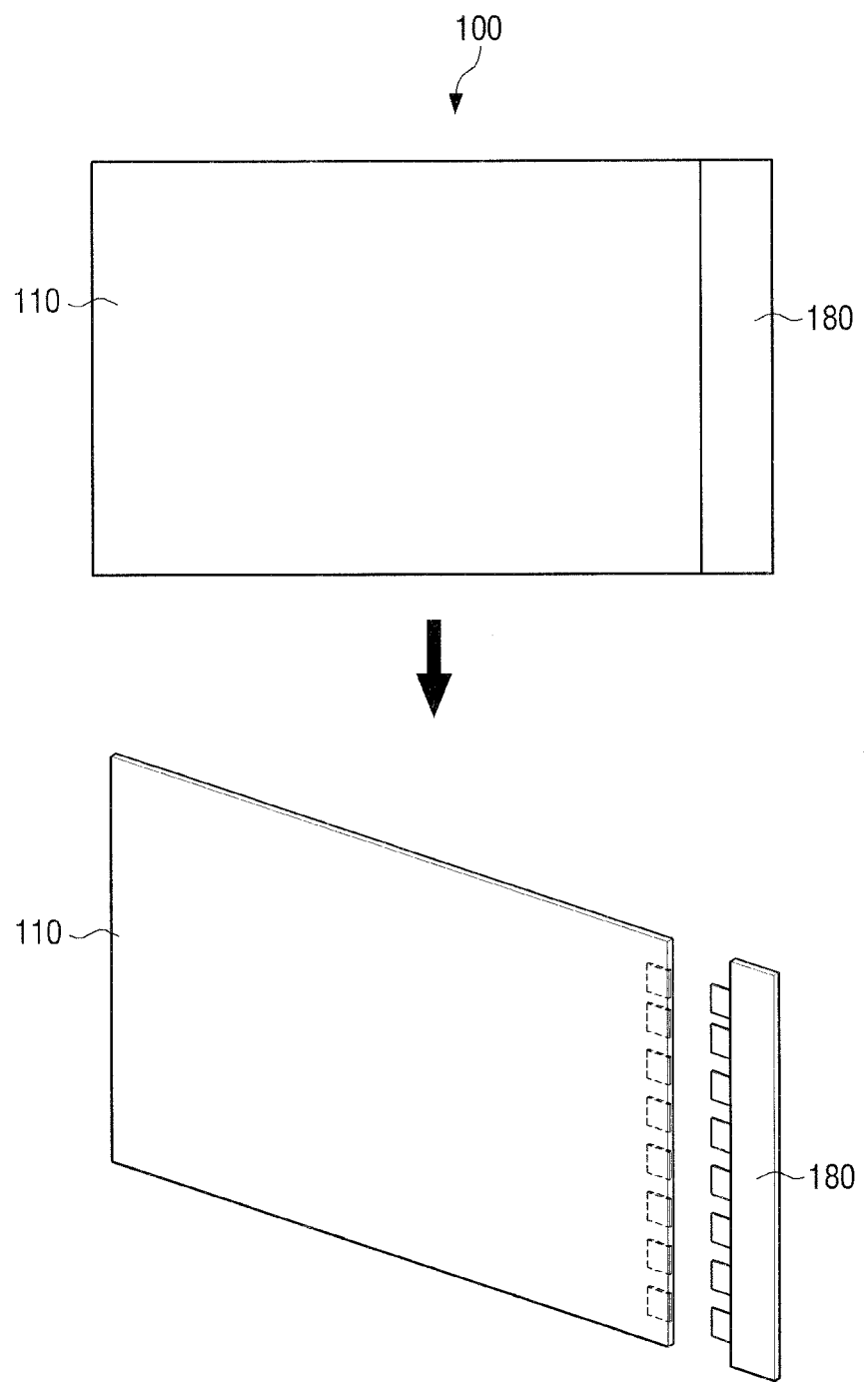
FIG. 31 illustrates a flexible display device having a detachable power supply according to an embodiment of the present disclosure.

FIG. 31 illustrates a flexible display device having a detachable power supply according to an embodiment of the present disclosure.

Referring to FIG. 31, the power supply 180 may be detachably provided at an edge of one side of the flexible display device.

The power supply 180 may be made of a flexible material to be bent together with the display 110. More specifically, the power supply 180 may include a cathode collector, a cathode electrode, an electrolyte, an anode electrode, an anode collector, and a coating covering the above-described elements.

As an example, the collector may be made of TiNi-based alloys having good elastic properties, pure metals, such as copper and aluminum, carbon-coated pure metal, conductive materials, such as carbon and carbon fiber, and conductive polymer, such as polypyrrole.

The cathode electrode may be made of cathode electrode materials including metals, such as lithium, sodium, zinc, magnesium, cadmium, hydrogen storage alloy, and lead, non-metals, such as carbon, and cathode materials, such as polymer electrode materials, such as organic sulfur.

The anode electrode may be made of anode electrode materials including sulfur, metal sulfide, lithium transition metal oxide, such as $LiCoO_2$, $SOCl_2$, $NmO_2$, $Ag_2O$, $Cl_2$, $NiCl_2$, NiOOH, and polymer electrode. The electrolyte may be implemented in the form of a gel using PolyEthylene Oxide (PEO), PolyVinylidene Fluoride (PVdF), PolyMethylMethAcrylate (PMMA), and PolyVinyl Acetate Copolymer (PVAC).

As the coating, typical polymer resin may be used. For example, PVC, HDPE, or epoxy resin may be used. In addition, any material may be used as the coating in so far as it can be freely curved or bent while preventing the damage of the battery.

The anode electrode and the cathode electrode in the power supply 180 may include a connector for electrically connecting to the outside.

Referring to FIG. 31, the connector is formed to project from the power supply 180, and a groove that corresponds to the position, size, and shape of the connector is formed on the display 110. Accordingly, through coupling of the connector and the groove to each other, the power supply 180 may be coupled to the display 110. The connector of the power supply 180 may be connected to a power connection pad (not illustrated) in the flexible display device 100 to supply the power.

In an implementation, FIG. 31 illustrates that the power supply 180 is detachably provided at the edge of one side of the flexible display device 100. However, the position and the shape of the power supply 180 may differ in various ways depending on the product characteristics. For example, if the flexible display device 100 has somewhat a thickness, the power supply 180 may be mounted on the rear surface of the flexible display device 100.

Figure 32A:
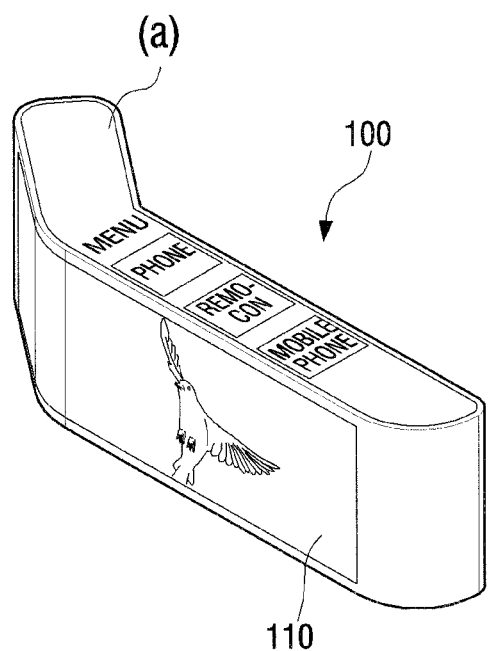
FIGS. 32A and 32B illustrate cases where a flexible display device is implemented as a stereoscopic display device rather than a flat panel display device according to an embodiment of the present disclosure.
Figure 32B:
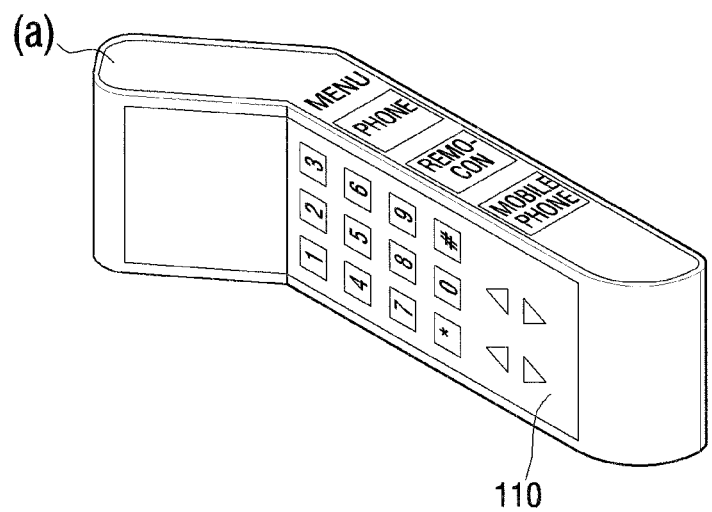

FIGS. 32A and 32B illustrate cases where a flexible display device is implemented as a stereoscopic display device rather than a flat panel display device according to an embodiment of the present disclosure.

Referring to FIGS. 32A and 32B, the display 110 may be provided on one side of the flexible display device 100, and various types of hardware, such as buttons, a speaker, a microphone, and an InfraRed (IR) lamp, may be provided on the other surface.

In the flexible display device 100 as illustrated in FIGS. 32A and 32B, the whole or a part of an external case may be made of rubber or polymer resin to be flexibly bent. Accordingly, the whole or a part of the flexible display device 100 may have the flexible characteristic.

The flexible display device 100 may perform a new operation that is different from the previous operation according to the bending. For example, the flexible display device 100 may perform a remote control function for controlling an external device in a normal state, and may perform a phone function if a bending gesture is performed in one area. In a case of performing the remote control function, a remote control button may be displayed on the display 110, and in the case of performing the phone function, a dial pad may be displayed on the display 110.

Figure 33:
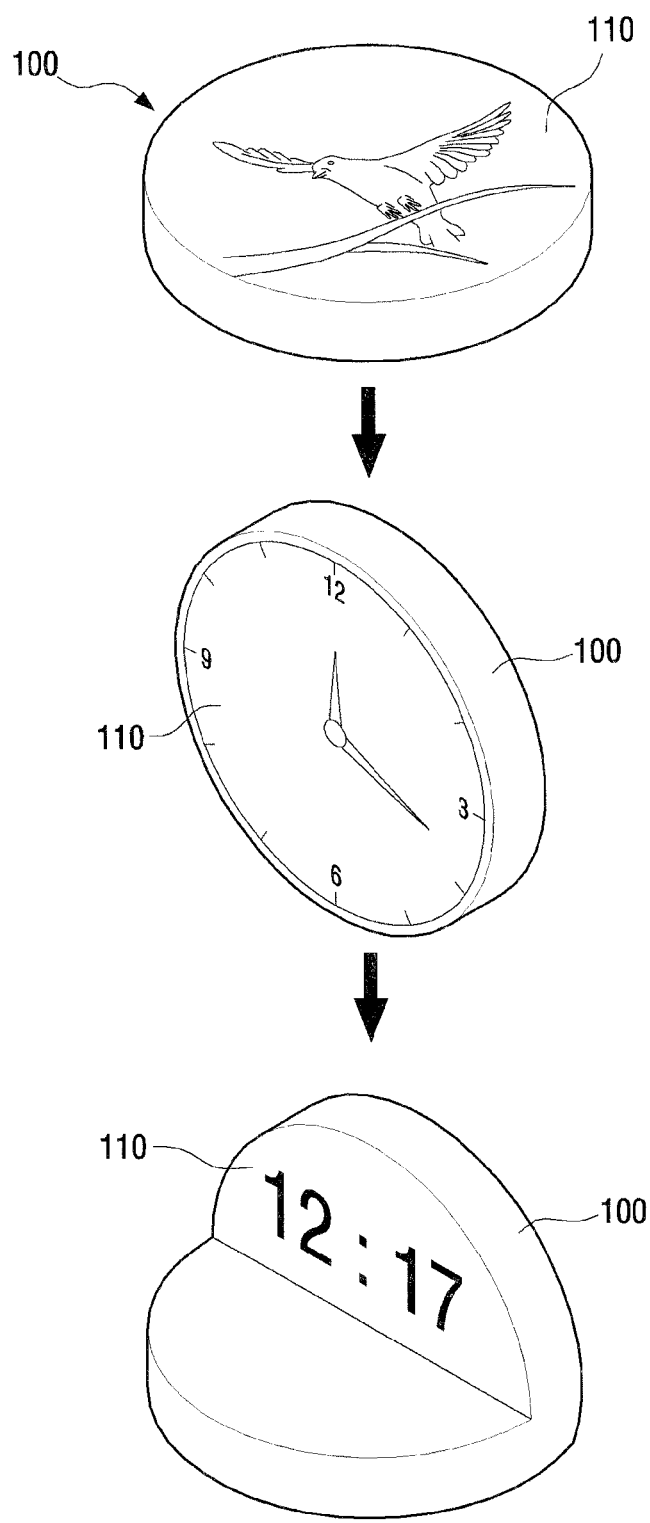
FIG. 33 illustrates a case where a flexible display device is implemented in form of a circle according to an embodiment of the present disclosure.

FIG. 33 illustrates a case where a flexible display device is implemented in form of a circle according to an embodiment of the present disclosure.

Referring to FIG. 33, the flexible display device 100 performs different operations in visibility and functionality depending on the seating state or the bending state of the flexible display device 100. For example, if the flexible display device 100 is horizontally put on the floor, it may display a photo or other content, whereas if the flexible display device 100 vertically stands on the floor, it may perform a table clock function. Further, if the center portion of the flexible display device is bent by about 90 degrees, it may perform a notebook Personal Computer (PC) function. In this case, a soft keyboard is displayed on one of the bent areas, and a display window may be displayed on the other area.

In addition, the flexible display device may be implemented in various forms. For example, in a case where the flexible display device is implemented as a device that is not provided with the display, the flexible display device can be implemented so as to perform a different function in the divided areas based on the bending.

On the other hand, the various display methods according to various embodiments as described above may be implemented as programs to be provided to the flexible display devices.

As an example, a non-transitory computer readable medium, which stores a program to execute displaying a first content on a screen, detecting bending of the flexible display device, determining one area and the other area of the screen as a first screen and a second screen, respectively, based on the bending, and displaying the first content on the first screen and displaying a second content that is different from the first content on the second screen, may be provided.

In addition, a non-transitory computer readable medium, which stores a program to perform various methods for dividing the screen based on the bending according to the above, may be provided.

Certain aspects of the present disclosure can also be embodied as computer readable code on a non-transitory computer readable recording medium, which is not a medium that stores data for a short period, such as a register, a cache, or a memory, but may be a medium which semi-permanently stores data and is readable by a device. Specifically, various applications and programs as described above may be stored and provided in the non-transitory computer readable medium. Examples of the non-transitory computer readable recording medium include a ROM, a RAM, a Compact Disc-ROM (CD-ROM), a Digital Versatile Disc (DVD), a hard disc, a Blu-ray disc, a USB, a memory card, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible display device comprising:
   a display;
   a sensor configured to detect deformation of the flexible display device; and
   a controller configured to:
   control the sensor to detect deformation of the flexible display device,
   determine one area of the display as a first display area and another area of the display as a second display area based on a line determined by the deformation, the first display area being on one side of the line and the second display area being on another side of the line,
   control the display to display a first content on the first display area, control the display to display a second content that is different from the first content on the second display area, and control reproduction of at least one of the first content and the second content according to a user command for moving the line.

2. The device of claim 1, wherein the second content comprises content displayed on the display before the deformation.

3. The device of claim 1, wherein the first content comprises a current content page, and wherein the second content comprises a previous content page.

4. The device of claim 3, wherein the controller is further configured to display a part that corresponds to the second display area of the previous content page on the second display area.

5. The device of claim 1, wherein the controller is further configured to change shapes and sizes of the first display area and the second display area in accordance with the user command for moving a portion between the first display area and the second display area.

6. The device of claim 5, wherein the controller is further configured to terminate execution or reproduction of the first content or the second content displayed on the first display area or the second display area, in response to the moved line deviating out of the display according to the moving of the line.

7. The device of claim 1, further comprising a pressure sensor configured to detect pressure that is applied by a touch operation,
wherein the controller is further configured to display information on a page amount that corresponds to a level of the pressure and to display a previous content page that corresponds to the information on the page amount based on a current content page on the second display area, in response to the deformation being detected in a state where the information on the page amount is displayed.

8. The device of claim 7, wherein the touch operation comprises at least one of a touch operation accompanied by the deformation operation of the flexible display device or a touch operation that is applied to a touch area provided on the display of the flexible display device.

9. The device of claim 1, further comprising a pressure sensor configured to detect pressure that is applied by a touch operation,
wherein the controller is further configured to display a previous content page in an order that corresponds to a level of the pressure among a plurality of previous content pages previously displayed based on a current content page on the second display area.

10. A method for controlling a flexible display device, the method comprising:
detecting, by a sensor, deformation of the flexible display device;
determining, by the controller, one area of a display as a first display area and another area of the display as a second display area based on a line determined by the deformation, the first display area being on one side of the boundary line and the second display area being on another side of the boundary line;
displaying, by the display, a first content on the first display area and displaying a second content that is different from the first content on the second display area; and controlling, by the controller, reproduction at least one of the first content and the second content according to a user command for moving the line.

11. The method of claim 10, wherein the second content comprises content displayed on the display before the deformation.

12. The method of claim 11, wherein the first content comprises a current content page, and wherein the second content comprises a previous content page.

13. The method of claim 12, wherein the displaying of the second content displays a part that corresponds to the second display area of the previous content page on the second display area.

14. The method of claim 10, further comprising changing shapes and sizes of the first display area and the second display area in accordance with the user command for moving a portion between the first display area and the second display area.

15. The method of claim 14, further comprising terminating execution or reproduction of content that corresponds to the first content or the second content displayed on the first display area or the second display area, in response to the moved portion deviating out of the display according to the moving of the portion.

16. The method of claim 10, further comprising:
detecting pressure that is applied by a touch operation;
displaying information on a page amount that corresponds to a level of the pressure on the display; and
displaying a previous content page that corresponds to the information on the page amount based on a current content page on the second display area, in response to the deformation being detected in a state where the information on the page amount is displayed.

17. The method of claim 16, wherein the touch operation comprises at least one of a touch operation accompanied by the deformation of the flexible display device or a touch operation that is applied to a touch area provided on the display of the flexible display device.

18. The method of claim 10, further comprising:
detecting pressure that is applied by a touch operation; and
displaying a previous content page in an order that corresponds to a level of the pressure among a plurality of previous content pages previously displayed based on a current content page on the second display area.

19. A non-transitory processor readable medium for storing a computer program of instructions configured to be readable by at least one processor for instructing the at least one processor to execute a computer process for performing the method as recited in claim 10.

20. The device of claim 1,
wherein the first content comprises an application that is currently executed, and
wherein the second content comprises another application that is executed as multitasking with the application.

21. The method of claim 10,
wherein the first content comprises an application that is currently executed, and
wherein the second content comprises another application that is executed as multitasking with the application.

* * * * *